US010789833B2

(12) United States Patent
Benstein

(10) Patent No.: US 10,789,833 B2
(45) Date of Patent: Sep. 29, 2020

(54) POWER ADJUSTABLE FURNITURE MANAGEMENT SYSTEMS AND METHODS

(71) Applicant: Standata Technology, LLC, Manchester, NH (US)

(72) Inventor: Thomas A. Benstein, Boca Raton, FL (US)

(73) Assignee: Standata Technology, LLC, Manchester, NH (US)

( * ) Notice: Subject to any disclaimer, the term of this patent is extended or adjusted under 35 U.S.C. 154(b) by 0 days.

(21) Appl. No.: 16/266,367

(22) PCT Filed: Oct. 19, 2018

(86) PCT No.: PCT/US2018/056632
§ 371 (c)(1),
(2) Date: Nov. 15, 2019

(87) PCT Pub. No.: WO2019/079674
PCT Pub. Date: Apr. 25, 2019

(65) Prior Publication Data

US 2020/0193805 A1 Jun. 18, 2020

Related U.S. Application Data

(60) Provisional application No. 62/574,399, filed on Oct. 19, 2017.

(51) Int. Cl.
*A47C 20/00* (2006.01)
*A61G 7/002* (2006.01)
(Continued)

(52) U.S. Cl.
CPC ......... *G08C 17/02* (2013.01); *G08C 2201/30* (2013.01); *G08C 2201/42* (2013.01); *G08C 2201/51* (2013.01); *G08C 2201/93* (2013.01)

(58) Field of Classification Search
CPC ... G06F 16/951; G08C 17/02; G08C 2201/50; G08C 2201/93; H04L 12/2818;
(Continued)

(56) References Cited

U.S. PATENT DOCUMENTS 6,492,786 B1 * 12/2002 Vang .................... A47C 1/0242 280/647
6,570,491 B1 * 5/2003 Bastholm ............. A47C 31/008 340/10.3
(Continued)

FOREIGN PATENT DOCUMENTS

WO WO-2015085724 A1 * 6/2015 ......... H04L 12/2827

OTHER PUBLICATIONS

PCT Search Report and Written Opinion for PCT Application No. PCT/US2018/056632 filed on Oct. 19, 2018, dated Jan. 3, 2019, 8 pages.
(Continued)

*Primary Examiner* — Yong Hang Jiang
(74) *Attorney, Agent, or Firm* — Finch & Maloney PLLC

(57) ABSTRACT

Techniques and architectures are disclosed for power-adjustable furniture management systems and methods. The system includes a first power-adjustable furniture and a second power-adjustable furniture connected to an electrical source. The first power-adjustable furniture is communicatively coupled to a computing device. The computing device includes a processor, and a power management mode executable by the processor. The power management mode is configured to adjust the first power-adjustable furniture. The power management mode is further configured to prevent the first power-adjustable furniture from being adjusted while the second power-adjustable furniture is operated. The computing device is communicatively coupled to a server computer via the network.

20 Claims, 16 Drawing Sheets

(51) Int. Cl.
*A61G 7/018* (2006.01)
*G01M 1/38* (2006.01)
*G08C 17/00* (2006.01)
*G08C 17/02* (2006.01)

(58) Field of Classification Search
CPC ........... H04L 12/282; H04L 2012/2841; H04L 67/025; H04L 67/12; H04M 1/7253; H04M 1/72533; H04M 2250/74; H04W 4/12; H04W 4/20; H04W 4/80; H04W 4/60; H04W 8/005; H04W 4/021; H04W 4/027; H04W 72/0413; H04W 4/70; H04W 52/0212; H04W 88/08; H04W 48/00; H04W 4/00; H04W 4/02; H04W 4/023; H04W 4/30; H04W 76/11; H04W 84/18; H04W 88/02; H04W 8/24
USPC .............................. 340/12.22, 12.5; 343/750
See application file for complete search history.

(56) References Cited

U.S. PATENT DOCUMENTS

| | | | | |
|---|---|---|---|---|
| 2008/0262657 | A1 | 10/2008 | Howell et al. | |
| 2012/0112890 | A1 | 5/2012 | Rawls-Meehan | |
| 2014/0321004 | A1 | 10/2014 | Lukas et al. | |
| 2015/0130595 | A1* | 5/2015 | Hille | G08C 23/04 340/12.5 |
| 2016/0371955 | A1 | 12/2016 | Alshinnawi et al. | |
| 2019/0132436 | A1* | 5/2019 | Jang | H04W 4/12 |

OTHER PUBLICATIONS

Lily Lou, "Meet Live OS, A Desk Sensor That Tracks Your Activity", Jun. 12, 2017,[retrieved online on Aug. 21, 2017] URL: http://lifehacker.com/meet-live-os-a-desk-sensor-that-tracks-your-activity-1796028197, 3 pages.

Sarah Kessler, "Herman Miller, Creator of the Aeron Chair, Wants to Make Your Desk More Like a Fitbit", Jun. 12, 2017, [retrieved online on Aug. 21, 2017] URL: https://qz.com/1002705/herman-miller-creator-of-the-aeron-chair-wants-to-make-your-desk-more-like-a-fitbit, 6 pages.

"New From Herman Miller", [retrieved online on Aug. 21, 2017} URL: http://www.hermanmiller.com/smart-office/smart-furnishings/live-os.html, 3 pages.

"Logicdata At Neocon—Highlights 2017", [retrieved online Aug. 21, 2017], URL: http://www.logicdata.net/blog/2017/06/07/neocon-2017-logicdata-product-highlights, 3 pages.

International Preliminary Report on Patentability received for PCT Application No. PCT/US2018/056632. dated Apr. 30, 2020. 6 pages.

* cited by examiner

| FIG. 12A |
| --- |
| FIG. 12B |

| FIG. 12A |
| --- |
| FIG. 12B |

POWER ADJUSTABLE FURNITURE MANAGEMENT SYSTEMS AND METHODS

RELATED APPLICATIONS

This application claims priority under 35 U.S.C. § 371 to PCT Patent Application Serial No. PCT/US18/56632, filed on Oct. 19, 2018, and titled POWER-ADJUSTABLE FURNITURE MANAGEMENT SYSTEMS & METHODS, which claims the benefit under 35 U.S.C. § 119(e) to U.S. Provisional Patent Application Ser. No. 62/574,399, filed on Oct. 19, 2017, and titled POWER-ADJUSTABLE FURNITURE MANAGEMENT SYSTEMS & METHODS, each of which is hereby incorporated herein by reference in its entirety.

FIELD OF THE DISCLOSURE

This disclosure relates to power management systems and applications, and more particularly to power management systems and applications for power-adjustable furniture.

BACKGROUND

Many work environments, such as office buildings and home offices, include power-adjustable furniture (e.g., a power-adjustable desk) that promote personal health and well-being. There are many health benefits that are achievable by adjusting one's position or otherwise periodically moving about while performing tasks over a given period of time. For instance, a person may burn more calories by standing while performing at least some of a task instead of sitting down. Adjustable furniture can also improve a person's morale by empowering individuals to customize their particular work environment to satisfy personal preferences. The adjustable furniture is connected to a source of electrical power, for example an electrical outlet, which provides electricity to raise and lower a work surface.

SUMMARY

In one example, a power-adjustable furniture control system is provided. The system includes a mobile computing device. The mobile computing device includes a memory, a user interface, at least one network interface, and at least one processor coupled to the memory, the user interface, and the at least one network interface. The mobile computing device is configured to receive, via the user interface, input requesting an adjustment of a piece of power-adjustable furniture; transmit, to a server via the at least one network interface, a request to change a status associated with the piece of power-adjustable furniture to active; receive, from the server via the at least one network interface, a notification indicating whether the server changed the status to active; determine whether the notification indicates the server changed the status to active; and transmit, to the piece of power-adjustable furniture via the at least one network interface, an instruction to perform the adjustment where the notification indicates the server changed the status to active.

In the power-adjustable furniture control system, the mobile computing device may be one or more of a smart phone and a tablet, and the piece of power-adjustable furniture may be a power-adjustable desk. The at least one processor may be further configured to display, via the user interface, a message indicating the piece of power-adjustable furniture cannot be adjusted where the notification indicates the server did not change the status to active.

The power-adjustable furniture control system may further include the server. The server may include a server memory storing group data. The group data may include first data identifying a plurality of pieces of power-adjustable furniture coupled to a power distribution system, the plurality of pieces comprising the piece of power-adjustable furniture; second data specifying a maximum number of the plurality of pieces of power-adjustable furniture to which the power distribution system is designed to supply concurrently power for adjustment; and third data specifying a total number of the plurality of pieces of power-adjustable furniture associated with a status of active.

In the power-adjustable furniture control system, wherein the at least one processor may be further configured to transmit, to the server via the at least one network interface, a request to specify the maximum number; receive, from the server via the at least one network interface, a response specifying the maximum number; transmit, to the server via the at least one network interface, a request to specify the total number; receive, from the server via the at least one network interface, a response specifying the total number; compare the maximum number to the total number to determine whether the total number is less than the maximum number; and transmit, to the piece of power-adjustable furniture via the at least one network interface, the instruction to perform the adjustment where the notification indicates the server changed the status to active and the total number is less than the maximum number.

The at least one processor may be further to display, via the user interface, the message indicating the piece of power-adjustable furniture cannot be adjusted where either the notification indicates the server did not change the status to active or the total number is not less than the maximum number.

The server may further include one or more processors coupled to one or more network interfaces and the one or more processors are configured to receive, from the mobile computing device via the one or more network interfaces, the request to change the status; compare the maximum number to the total number to determine whether the total number is less than the maximum number; change the status to active where the total number is less than the maximum number; and transmit, to the mobile computing device via the one or more network interfaces, a notification indicating that the server changed the status to active. The one or more processors may be further configured to maintain the status as inactive where the total number is less than the maximum number; and transmit, to the mobile computing device via the one or more network interfaces, a notification indicating that the server did not change the status to active.

In the power-adjustable furniture control system, the at least one network interface may include a first network interface configured to communicate with the piece of power-adjustable furniture and a second network interface configured to communicate with the server. The mobile computing device may include an accelerometer. The at least one processor may be further configured to pair the mobile computing device with the piece of power-adjustable furniture at least in part by transmitting, to the piece of power-adjustable furniture via the first network interface, an instruction to execute a movement that is detectable by the accelerometer; and identifying, via the accelerometer, the movement.

In another example, a method for controlling a piece of power-adjustable furniture using a mobile computing device is provided. The method includes acts of receiving, via a user interface of the mobile computing device, input requesting an adjustment of the piece of power-adjustable furniture; transmitting, to a server via at least one network interface of the mobile computing device, a request to change a status associated with the piece of power-adjustable furniture to active; receiving, from the server via the at least one network interface, a notification indicating whether the server changed the status to active; determining whether the notification indicates the server changed the status to active; transmitting, to the piece of power-adjustable furniture via the at least one network interface, an instruction to perform the adjustment where the notification indicates the server changed the status to active; and displaying, via the user interface, a message indicating the piece of power-adjustable furniture cannot be adjusted where the notification indicates the server did not change the status to active.

The method may further include acts of transmitting, to the server via the at least one network interface, a request to specify a maximum number of pieces of power-adjustable furniture that a power distribution system coupled to the piece of power-adjustable furniture is designed to supply concurrently power for adjustment; receiving, from the server via the at least one network interface, a response specifying the maximum number; transmitting, to the server via the at least one network interface, a request to specify a total number of pieces of power-adjustable furniture coupled to the power distribution system that are associated with a status of active; receiving, from the server via the at least one network interface, a response specifying the total number; comparing the maximum number to the total number to determine whether the total number is less than the maximum number; transmitting, to the piece of power-adjustable furniture via the at least one network interface, the instruction to perform the adjustment where the notification indicates the server changed the status to active and the total number is less than the maximum number; and displaying, via the user interface, the message indicating the piece of power-adjustable furniture cannot be adjusted where either the notification indicates the server did not change the status to active or the total number is not less than the maximum number.

The method may further include an acts of receiving, from the mobile computing device via one or more network interfaces of the server, the request to change the status; comparing the maximum number to the total number to determine whether the total number is less than the maximum number; changing the status to active where the total number is less than the maximum number; and transmitting, to the mobile computing device via the one or more network interfaces, a notification indicating that the server changed the status to active.

The method may further include an acts of maintaining the status as inactive where the total number is less than the maximum number; and transmitting, to the mobile computing device via the one or more network interfaces, a notification indicating that the server did not change the status to active.

In the method, the act of receiving the input may include an act of receiving the input via either a smart phone or a tablet and the act of transmitting the instruction may include an act of transmitting an instruction to a power-adjustable desk. The method may further include pairing the mobile computing device with the piece of power-adjustable furniture at least in part by transmitting, to the piece of power-adjustable furniture via the at least one network interface, an instruction to execute a movement; and identifying, via an accelerometer of the mobile computing device, the movement.

In another example, a non-transitory computer-readable medium is provided. The computer-readable medium storing sequences of computer executable instructions for controlling a piece of power-adjustable furniture. The sequences of computer executable instructions include instructions to receive, via a user interface, input requesting an adjustment of the piece of power-adjustable furniture; transmit, to a server via at least one network interface, a request to change a status associated with the piece of power-adjustable furniture to active; receive, from the server via the at least one network interface, a notification indicating whether the server changed the status to active; determine whether the notification indicates the server changed the status to active; transmit, to the piece of power-adjustable furniture via the at least one network interface, an instruction to perform the adjustment where the notification indicates the server changed the status to active; and display, via the user interface, a message indicating the piece of power-adjustable furniture cannot be adjusted where the notification indicates the server did not change the status to active.

The sequences of computer executable instructions may further include instructions to transmit, to the server via the at least one network interface, a request to specify a maximum number of pieces of power-adjustable furniture that a power distribution system coupled to the piece of power-adjustable furniture is designed to supply concurrently power for adjustment; receive, from the server via the at least one network interface, a response specifying the maximum number; transmit, to the server via the at least one network interface, a request to specify a total number of pieces of power-adjustable furniture coupled to the power distribution system that are associated with a status of active; receive, from the server via the at least one network interface, a response specifying the total number; compare the maximum number to the total number to determine whether the total number is less than the maximum number; transmit, to the piece of power-adjustable furniture via the at least one network interface, an instruction to perform the adjustment where the notification indicates the server changed the status to active and the total number is less than the maximum number; and display, via the user interface, a message indicating the piece of power-adjustable furniture cannot be adjusted where either the notification indicates the server did not change the status to active or the total number is not less than the maximum number.

The sequences of computer executable instructions may be executable by either a processor within a desktop computer (such as an Intel Core i5 processor or other general purpose processor) or a processor within the piece of power-adjustable furniture (such as an AMD EPYC processor or other embedded processor). The piece of power-adjustable furniture may be a power-adjustable desk.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

Figure 1:
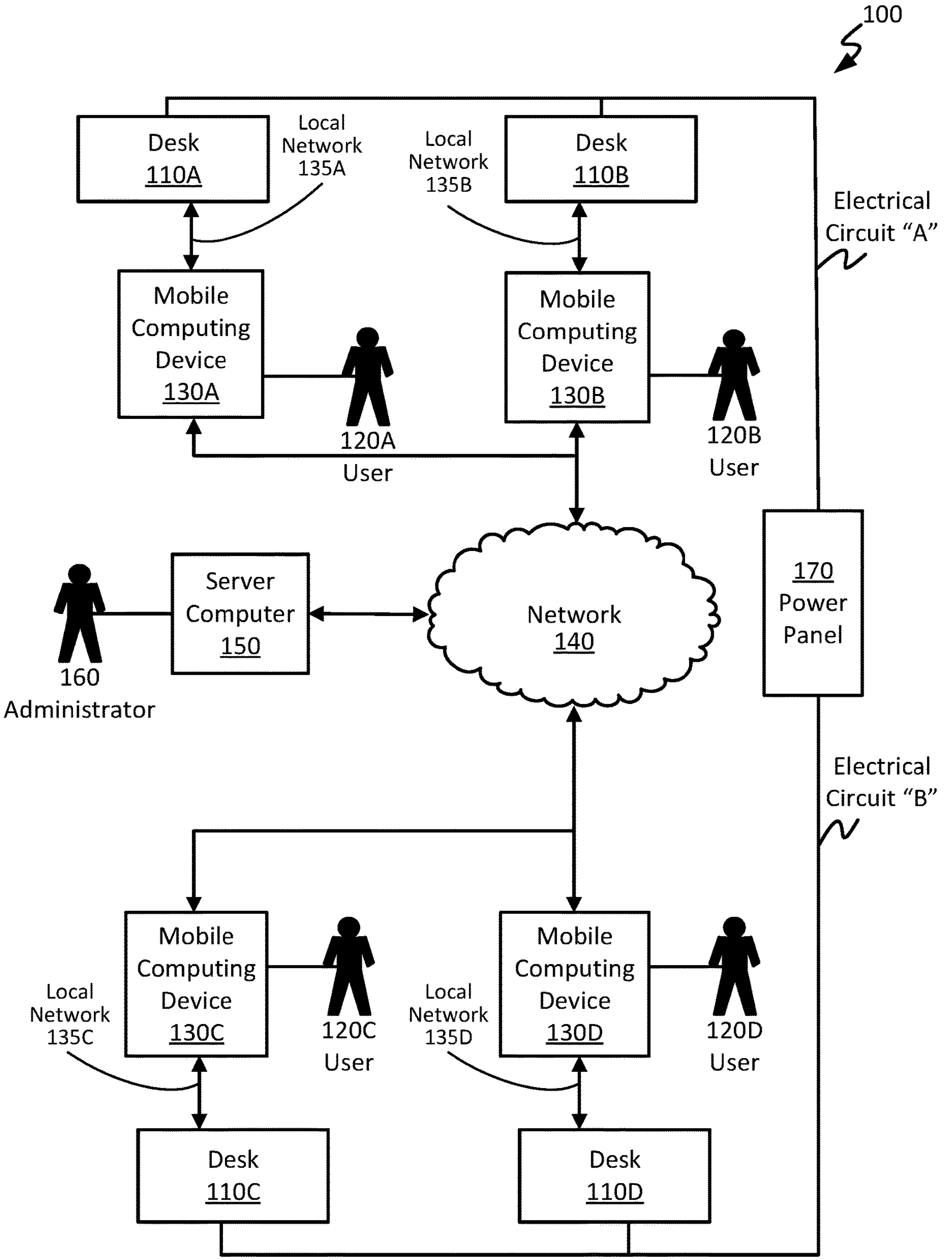
FIG. 1 is a block diagram of a power management system for a plurality of power-adjustable desks configured in accordance with an embodiment of the present disclosure.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

Techniques and architectures are disclosed for a power management system and application configured to manage operation power-adjustable furniture (e.g., desks, tables, chairs, etc. equipped with powered adjustable legs) connected together in a system to prevent electrically overloading the system as the power-adjustable furniture is operated. The system, in some examples, includes a first power-adjustable desk (e.g., a LifeDesk® height adjustable desk) and a second power-adjustable desk. Each power-adjustable desk includes a work surface and is connected to an electrical source (e.g., a power panel). A computing device (e.g., a mobile computing device) is communicatively coupled to one of the first power-adjustable desk and the second power-adjustable desk. Once communicatively coupled to the power-adjustable desk, the computing device is configured to operate of the power-adjustable desk to adjust the height of its work surface above the floor. The computing device, in some examples, includes a display, for example a touch-screen display, for presenting a graphical user interface, a processor, and a power management mode or application executable by the processor. The power management application is configured to operate the power-adjustable desk to adjust its height in response to a user input (e.g., a tap or swipe gesture) received by the graphical user interface. The power management application is further configured to prevent the power-adjustable desk from being adjusted while the one or more other power-adjustable desks are operated to prevent electrically overloading the system. To this end, the mobile computing device is also communicatively coupled to a server computer via a network, such as a Wi-Fi network. The server computer coordinates the operation of the group of power-adjustable desks within an area in response to receiving information (e.g., adjustment requests) from one or more mobile computing devices associated with the power-adjustable desks. The server is further configured to transmit information (e.g., authorization to perform an adjustment) to the mobile computing devices to allow the power-adjustable desks to be safely adjusted without electrically overloading the system.

General Overview

As described above, power-adjustable furniture (e.g., a power-adjustable desk) improve the health and well-being of people that use such devices to perform tasks or assigned work. Thus, power-adjustable furniture has become increasingly popular with businesses, especially, with large businesses, such as banks or brokerage and investment firms that employ many people, each of which is assigned a desk and work station. Sometimes, however, the existing electrical infrastructure of an office building is not sized to accommodate the electricity needs to operate a plurality of power-adjustable furniture within one area at one time. Although the likelihood of operating all pieces of power-adjustable furniture together at one time may be relatively low, local electrical codes may require that electrical circuits of a building be sized to support an intended electrical load. In addition, the amount of electricity available from existing electrical infrastructures within an area is reduced by other electrical devices (e.g., computers and printers) needed to perform work. Thus, businesses, in many instances, limit the number of power-adjustable furniture within a given area to comply with electrical codes or simply chose not to install power-adjustable furniture. Moreover, the cost to upgrade electrical infrastructure, in many cases, may be an obstacle to installing power-adjustable furniture.

Thus, and in accordance with an embodiment of the present disclosure, techniques and architectures are disclosed for a power management system and application configured to manage operation of power-adjustable furniture connected together in a system to prevent electrically overloading the system as the furniture is operated. Power-adjustable furniture can also include exam room tables or equipment lifts, to name only a few other example applications. The system, in some examples, includes a first power-adjustable desk (e.g., a LifeDesk® height adjustable desk) and a second power-adjustable desk connected to a source of electricity (e.g., a power distribution system, which may include power panels, circuit breakers, wiring, etc.).

Some pieces of the power-adjustable furniture (e.g., a power-adjustable desk) may include a work surface that can be raised or lowered to accommodate a change in position or posture of a user. In some examples, these power-adjustable desks include physical controls for adjusting the height of the work surface. However, in other examples, the power-adjustable desks do not include any physical controls for adjusting the height of the desk, and thus a user cannot manually adjust the height of the power-adjustable desks. This is particularly noteworthy because multiple manual adjustments performed concurrently may cause an overload of the power distribution system. Overloading the power distribution system can cause a loss of electricity (e.g., a disconnected electrical circuit caused by a tripped circuit breaker) and/or damage to system components that can disrupt or adversely affect use of the power-adjustable furniture or other devices coupled to the power distribution system.

Thus, in accordance with embodiments of the present disclosure, the power-adjustable furniture is operated using a power management application executable on a mobile computing device (e.g., a smart phone or tablet) to coordinate the power-adjustable furniture operation to prevent electrically overloading the power distribution system. The mobile computing device, in some examples, includes a display, for example a touchscreen display, for presenting a graphical user interface, a processor, and a power management mode or application executable by the processor. In some examples, the mobile computing device is communicatively coupled to one of the first power-adjustable desk and the second power-adjustable desk. The power-adjustable desk and the mobile computing device are connected via a local network (e.g., a BLUETOOTH® or ZIGBEE® network). Once communicatively coupled to the power-adjustable desk, the mobile computing device operates of the power-adjustable desk (e.g., adjust the height of its work surface) to perform one or more height adjustments.

Executable on the mobile computing device is a power management application configured to safely operate one of a group of power-adjustable furniture within an area. The application, in some examples, initially determines a status, such as active or inactive status, for the power-adjustable furniture of the system. If the power-adjustable furniture is not being operated then it is assigned a status of inactive. On the other hand, a piece of power-adjustable furniture currently operating is assigned and associated with an active status.

In some examples, the power management application is configured to operate the power-adjustable furniture to adjust its height in response to a user input (e.g., a tap or swipe gesture) received by the graphical user interface. In response to the user input, in some examples, the power management application generates and transmits a status change request (e.g., requesting to be assigned active status) to a server computer for processing, as described further below. If the status change request is approved by the server computer, then the power management application generates and transmits to the power-adjustable furniture, instructions to adjust the height of the power-adjustable furniture in accordance with the user's input. On the other hand, if the status change request is denied, then the power management application is configured to prevent the power-adjustable furniture from being adjusted while the one or more pieces of power-adjustable furniture are operated to prevent electrically overloading the power distribution system that supplies the area with electricity. For instance, in some examples, the power management application is locked, and no height adjustments can be performed, in response to a denied or otherwise disapproved status change request.

In some examples, the mobile computing device is also communicatively coupled to a server computer via a network, such as a Wi-Fi network. The server computer is configured to coordinate the operation of the power-adjustable furniture to prevent electrically overloading the power distribution system. In some examples, the server computer receives information (e.g., status change requests) from one or more mobile computing devices associated with pieces of power-adjustable furniture within a group of power-adjustable furniture (e.g., power-adjustable desks connected to the same electrical circuit within the power distribution system). The server computer reviews the received status change requests by determining the number of pieces of power-adjustable furniture in active status and comparing that number to an operating threshold. The operating threshold is the number of piece of power-adjustable furniture (e.g., power-adjustable desks) for the group of power-adjustable furniture (that can be simultaneously operated at one time. A status change request is then approved when the number of power-adjustable furniture currently in active status is less than the operating threshold. Conversely, a status change request is denied or otherwise disapproved when the number of power-adjustable furniture in active status is equal to the operating threshold. The server is further configured to generate a response to a received status change request and transmit it to the mobile computing device. Based on the received response, the power management application can either lock the user interface of the application or provide instructions to the furniture to safely adjust it.

In accordance with another embodiment of the present disclosure, techniques and architectures are disclosed for a method of pairing a mobile computing device to a piece of power-adjustable furniture to establish a network connection for exchanging information. In some examples, each piece of power-adjustable furniture provides a wireless local network connection that users can connect to using their mobile computing devices. In most instances, several pieces of power-adjustable furniture are positioned relatively close to one another (e.g., power-adjustable desks arranged within cubicles) within an area. Thus, several wireless local network connection signals from different pieces of power-adjustable furniture will overlap with one another. While attempting to pair mobile computing devices to their particular piece of power-adjustable furniture, users are likely to receive many network signals associated with different pieces of power-adjustable furniture. To select the local network connection that connects a user's mobile computing device with their power-adjustable furniture, the method includes placing the mobile computing device onto a piece of power-adjustable furniture, for example a power-adjustable desk assigned to a particular user. With the mobile computing device placed on the power-adjustable furniture, the mobile computing device can connect to one of the available communications networks (e.g., a BLUETOOTH® or ZIGBEE® network) associated with the power-adjustable furniture. In some examples, the power management application can select a local network based on signal strength, for example the signal with the strongest signal is selected. With the local network connection established between the mobile computing device and one of the pieces of power-adjustable furniture located within the area, the power management application is configured to send a signal to move that piece of power-adjustable furniture via the local network. In response, the work surface of the power-adjustable furniture moves, for example ¼", 5⁄16" or ½", either upward or downward. Once the furniture is moved, the power management application is configured to receive an output signal from one or more accelerometers of the mobile computing device. If the accelerometer output indicates that the mobile computing device has not moved, then the power management application is configured to determine that the device is connected to a piece of power-adjustable furniture other than the furniture on which the device is positioned. The application can disconnect from the wireless local network, and select or otherwise establish another network connection with a wireless local network associated with another piece of power-adjustable furniture in the area. The above process is repeated until the application receives an accelerometer output that indicates movement of the mobile computing device. Once the power management application receives an indication of movement of the mobile computing device, the application is configured to determine that the device is paired with the proper furniture and maintains that established local network connection between the devices.

System Architecture and Operation

FIG. 1 is a block diagram of a power management system 100 for a plurality of adjustable power-adjustable desks 110A-D configured in accordance with an embodiment of the present disclosure. As previously described herein, the number of adjustable pieces of power-adjustable furniture installed within an area, such as office space, is often times limited, because the electrical power required to operate multiple power-adjustable desks at one time may be greater than permissible electrical load supported under local electrical codes. The systems and methods of the present disclosure solve this problem using a power management application designed to manage the operation of the power-adjustable furniture (e.g., power-adjustable desks) within the area so that the furniture can be safely operated without electrically overloading the power distribution system. Particularly, the system limits the number of pieces of power-adjustable furniture that can be operated at one time by coordinating the operation of individual pieces of power-adjustable furniture for a given group of power-adjustable furniture. In one example, the power management system 100 includes power-adjustable desks 110A-B (hereinafter referred to as desks 110A-D), users 120A-D, mobile computing devices 130A-D, a communications network 140, a server computer 150, a system administrator 160, and a power panel 170.

The desks 110A-D provide a work surface on which the user 120A-D performs tasks and places equipment, such as a computer system and telephone. In some examples, the desks 110A-D are power-adjustable legs attached to an object, for example, a work surface. The position of work surface of the desks 110A-D above the floor is adjustable so that a user can change his position to improve the user's comfort and/or ergonomic health. The desks 110A-D are adjustable using the application on the mobile computing device 130A-D, as will be described further herein. The desks 110A-D, in some examples, are communicatively coupled to a mobile computing device 130A-D via wireless local networks 135A-D, such as a BLUETOOTH® network.

Figure 2:
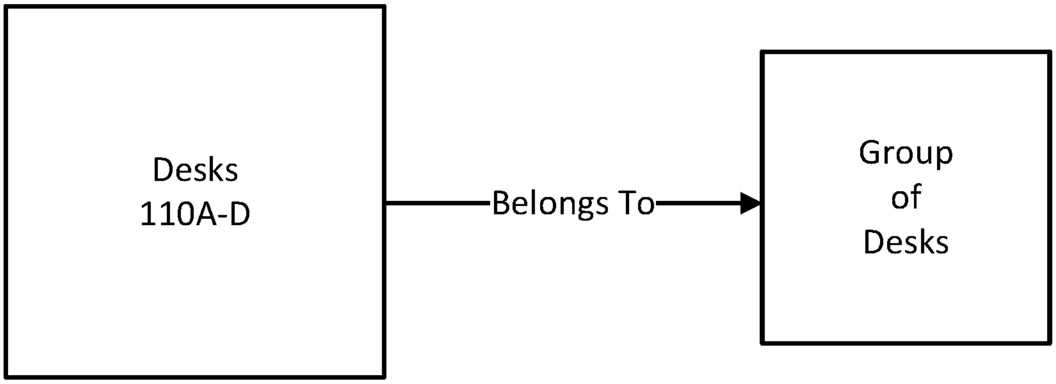
FIG. 2 illustrates an example entity relationship of a power-adjustable desk and a group of desks, in accordance with an example embodiment of the present disclosure.

Within the system 100, the desks 110A-D can be grouped together (e.g., multiple pieces of power-adjustable furniture connected to the same electrical circuit or within the same physical area) so that their operation can be coordinated to prevent electrically overloading the system 100. In this one example, the logical relationship between individual desks 110A-D and a group of desks is illustrated in FIG. 2. Each desk 110A-D, as well as, each group of desks within the system 100 are identified as entities for purposes of operating the power management application. For instance, a desk type entity is an entity that represents an individual desk (e.g., a desk 110A) that is connected to the power management application via a network (e.g., BLUETOOTH® network). A desk entity can have any one or combination of the following attributes: an identification number, local name, name, department, location, group identification number and status, just to name a few. Another entity type defined within the system 100 is a group entity. A group entity can be an arbitrary group of desks 110A-D that has a defined maximum number of desks 110A-D that can be in motion at one time. A group entity can have any one or combination of the following attributes: identification number, group name and maximum number of desks within the group, to name only a few. Additional desk and/or group entity attributes will be apparent in light of the present disclosure. As illustrated in FIG. 2, a one-to-many relationship exists between the group entity and the desk entity. In some embodiments, this relationship and the group and desk entities are implemented within a desk database, such as the desk database 340 described further below with reference to FIG. 3. Together, the desk and group entities are utilized by the system 100, along with function calls (e.g., web service protocols), to coordinate the operation of the desks 110A-D, as will be described further herein.

Communicatively coupled to the desks 110A-D are mobile computing devices 130A-D. The mobile computing devices 130A-D are configured to execute the power manage application to transmit instructions and/or commands to the adjustable desks 110A-D to change the height of the desks 110A-D. In general, the mobile computing devices 130A-D can be any computing device configured to operate the power management application of the present disclosure. To this end, the mobile computing devices 130A-D can be any of a wide range of computing platforms. In this one example, the devices 130A-D are mobile phones or smartphones or wearable or otherwise body-borne computing devices, such as a smartwatch. The mobile computing devices 130A-D can be, in part or in whole: a laptop/notebook computer or sub-notebook computer; a tablet computer; a personal digital assistant (PDA), or the like. In yet other examples, the mobile computing devices 130A-D may be stationary devices, such as a desktop computer. Other suitable configurations for mobile computing devices 130A-D will depend on a given application and will be apparent in light of this disclosure.

As can be further seen in this example, system 100 allows for communicative coupling with a communications network 140 and one or more servers 150 or other computing devices. Particularly, communicative coupling may be provided, for example, between the server 150 and one or more mobile computing devices 130A-D via the network 140, as desired. The network 140 may be a wireless local area network, a wired local network, or a combination of local wired and wireless networks, and may further include access to a wide area network such as the Internet or a campus-wide network. In short, network 140 can be any communications network.

The server computer 150 may be any suitable computing system capable of communicating over a network 140, such as a cloud-based or web-based server computer, and may be programmed or otherwise configured to provide a power management related service, according to some embodiments. The server computer 150, in some examples, can be a virtualized server and/or part of a software as a service (SaaS) solution. For example, a power management related service might be that the server computer 150 is configured to verify operating statuses of one or more other desks within a group of desks prior to authorizing an adjustment of a single desk within that group, for example. The server computer 150 may execute various function calls to execute power management related services. The function calls, in some examples, are web service application programming interface (API) calls. A server-side web service API is a programmatic interface consisting of one or more publicly exposed endpoints to a defined request-response message system, typically expressed in JSON or XML, to name only a few standards that may be used. The endpoints are exposed via the internet, such as by an HTTP-based web server. In short, a web service API is a predefined protocol for communication between a web service and a web client. The web service may be supported by a web server and the web client access the web service via the web server. The following table (Table 1) further describe the details of the web service API syntax for one example of the system 100.

TABLE 1

| | Description |
|---|---|
| Element/Desks/Get | |
| Purpose | Retrieves a list of desks from the repository<br>Retrieve desk by LocalName<br>Retrieve desk by ID<br>Retrieve desk by GroupID<br>Filter by IsRunning (?isrunning=true) |
| URI | /desks<br>/desks/id/{id}<br>/desks/localname/{localname}<br>/desks/groupid/{groupid} |
| Method | GET |
| Request Body | NULL |
| Response Body | [{"ID": "59776b92221189f26a949935",<br>"LocalName": "BLE Device-EC78FA",<br>"Department": "Information Technology",<br>"Location": "North Wing",<br>"GroupID": "59888c89bac152c62bc19663",<br>"IsRunning": "false"}] |
| Element/Desks/Post | |
| Purpose | Inserts a list of desks |
| URI | /desks |
| Method | POST |
| Request Body | [{"LocalName": "BLE Device-EC78FA",<br>"Department": "Information Technology",<br>"Location": "North Wing",<br>"GroupID": "59888c89bac152c62bc19663",<br>"IsRunning": "false"}] |
| Response Body | [{"ID": "59776b92221189f26a949935",<br>"LocalName": "BLE Device-EC78FA",<br>"Department": "Information Technology",<br>"Location": "North Wing",<br>"GroupID": "59888c89bac152c62bc19663",<br>"IsRunning": "false"}] |
| Purpose | Edits a list of desks |
| URI | /desks |
| Method | PUT |
| Request Body | [{"ID": "59776b92221189f26a949935",<br>"LocalName": "BLE Device-EC78FA",<br>"Department": "Information Technology",<br>"Location": "North Wing",<br>"GroupID": "59888c89bac152c62bc19663", |

TABLE 1-continued

| | Description |
|---|---|
| | "IsRunning": "false" }] |
| Response Body | [{"ID": "59776b92221189f26a949935",<br>"LocalName": "BLE Device-EC78FA",<br>"Department": "Information Technology",<br>"Location": "North Wing",<br>"GroupID": "59888c89bac152c62bc19663",<br>"IsRunning": "false"}] |
| Element/Desks/Delete | |
| Purpose | Deletes a desk from the repository<br>By ID |
| URI | /desks/id/{id} |
| Method | DELETE |
| Request Body | NULL |
| Response Body | Number of rows affected<br>{"numRows": 1} |
| Element/Groups/Get | |
| Purpose | Retrieves a list of groups from the repository<br>Retrieve group by ID |
| URI | /groups<br>/groups/id/{id} |
| Method | GET |
| Request Body | NULL |
| Response Body | [{"ID": "59888c89bac152c62bc19663",<br>"GroupName": "North Wing Circuit 1",<br>"MaxinGroup": 2}] |
| Element/Groups/Post | |
| Purpose | Inserts a list of groups |
| URI | /groups |
| Method | POST |
| Request Body | [{"GroupName": "North Wing Circuit 1",<br>"MaxInGroup": 2}] |
| Response Body | [{"ID": "59888c89bac152c62bc19663",<br>"GroupName": "North Wing Circuit 1",<br>"MaxInGroup": 2}] |
| Purpose | Edits a list of groups |
| URI | /groups |
| Method | PUT |
| Request Body | [{"ID": "59888c89bac152c62bc19663",<br>"GroupName": "North Wing Circuit 1",<br>"MaxInGroup": 2}] |
| Response Body | [{"ID": "59888c89bac152c62bc19663",<br>"GroupName": "North Wing Circuit 1",<br>"MaxInGroup": 2}] |
| Element/Groups/Delete | |
| Purpose | Deletes a group from the repository<br>By ID |
| URI | /groups/id/{id} |
| Method | DELETE |
| Request Body | NULL |
| Response Body | Number of rows affected<br>{"numRows": 1} |

As can be seen in FIG. 1, the desks 110A-D are connected to a power panel 170 to receive electrical power therefrom. In general, the power panel 170 can be any electrical device (e.g., a main power panel or sub-panel) that distributes electricity to one or more different locations within area, such as an office building. In this one example, electricity from the power panel 170 is transmitted to the desks 110A-D via one or more electrical circuits, such as electrical circuits A and B. Each electrical circuit has a known number of adjustable desks 110A-D connected thereto. Note, that the operation of an individual adjustable desk 110A-D is dependent on the status of the other desks within that electrical circuit, as will be described further herein. For example, if the electrical load to operate both adjustable desks 110A-B is greater than permissible electrical load for circuit "A" then both desks cannot be operated simultaneously without causing damage to or shutting down power for that circuit (e.g., causing circuit breaker to trip and disconnect electricity to the circuit). Rather, each desk 110A-B is operated one at a time using the power management application of the present disclosure to avoid electrically overloading electrical circuit A.

Figure 3:
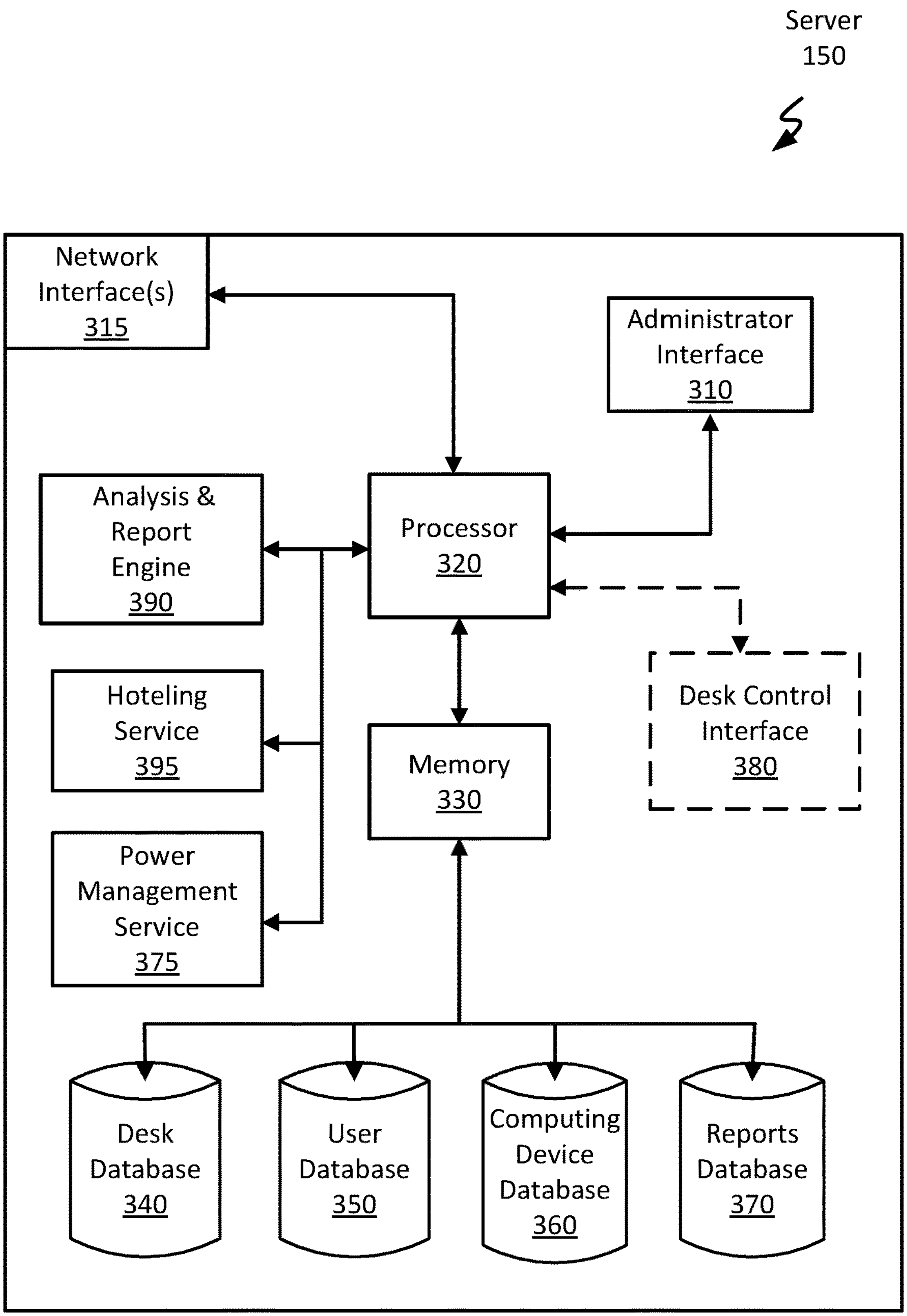
FIG. 3 is a block diagram of a server computer, in accordance with an embodiment of the present disclosure.

FIG. 3 is a block diagram of a server 150, in accordance with an embodiment of the present disclosure. In one example, the server 150 includes an administrator interface 310, a network interface(s) 315, a processor 320, a memory 330, an adjustable desk database 340, a user database 350, a mobile computing device database 360, a reports database 370, a power management service 375, analysis & report engine 390, and a hoteling service 395. In some examples, the server 150 optionally includes a desk control interface 380 (as indicated by the dotted lines).

The administrator interface 310 is executable by the at least one processor 320 and is configured to provide a user interface to the administrator 160 to input data into the system or retrieve information from the system. In general, the administrator 160 using the administrator interface 310 regulates the system 100 as a whole to manage its operation and efficient allocation of resources. In particular, using the interface 310 the Administrator 160 can update or otherwise modify system information, monitor system performance, and export data. In one example, the administrator interface 310 is configured to serve a browser-based user interface to the administrator 160 that is rendered by a web-browser running on a separate computing device (e.g., a lap-top computer or tablet) connected to the computing server 150 or integrated therein. In this one example, the administrator interface 310 exchanges (i.e. transmits or receives) system information with the administrator 160 via this user interface. System information may include any information used to operate the adjustable desks 110A-D and stored within a number of databases of the server 150, as will be described further herein. Specific examples of system information include desk locations, identifiers, positions, and statuses (e.g., active or non-active status). System information can also include user information, mobile computing device information, and administrator information. Although the example described above focuses on a web-based implementation of the administrator interface 310, examples are not limited to a web-based design. Other technologies, such as technologies employing a specialized, non-browser based interface, may be used without departing from the scope of the aspects of the present disclosure. Numerous other use cases will be apparent in light of this disclosure.

The administrator interface 310 can also be configured to provide an administrator view (e.g., serve an administrator screen) that includes information related to the desks of the system. This administrator view is configured to display the system information to assist the administrator with evaluating system performance. For example, the administrator view may display the number of available desks within an area, the current status of each desk, the number of instances in which users have logged into the application, and other data concerning the desk usage over a period of time. In this way, the administrator view displays information that enables administrators 160 to ensure that the system is effectively being utilized.

The server 150 also includes a network interface(s) 315 that exchanges (i.e. sends or receives) information, such as system information, with the mobile computing devices 130A-D via the network 140. Generally speaking, the network interface(s) 315 executes instructions and/or commands from the processor 320 to establish a network connection between the server computer 150 and one or more devices of the system 100, for example mobile computing devices 130A-D and/or desks 110A-D, depending on a given application. Information exchanged via the network interface(s) 315 may include any information used to establish and support a network connection between the server computer 150 and other components of the system. The network interface(s) 315 can be configured for wired (e.g., Universal Serial Bus or USB, Ethernet, FireWire, etc.) and/or wireless (e.g., Wi-Fi, etc.) communication, as desired. In one example, the network interface(s) 315 includes a transceiver or other network interface circuit configured to communicate locally and/or remotely utilizing any of a wide range of wired and/or wireless communications protocols, including, for example: a Wi-Fi protocol. In other examples, the network interface(s) 315 includes an ethernet port and a software stack configured to drive the operation thereof. Other suitable configurations for network interface(s) 315 will depend on a given application and will be apparent in light of this disclosure.

Communicatively coupled to the administrator interface 310 and network interface(s) 315 is at least one processor 320 to implement at least some of the aspects, functions and processes disclosed herein. Generally speaking, the processor 320 performs a series of instructions that result in manipulated data. The processor 320 may be any type of processor, multiprocessor or controller. Some exemplary processors include commercially available processors such as an Intel Xeon, Itanium, Core, Celeron, or Pentium processor, an AMD Opteron processor, a Sun UltraSPARC or IBM Power5+ processor and an IBM mainframe chip. The processor 320 is connected to other system components, including one or more memory devices, by for example using a bus.

The server computer 150 further includes the memory 330 configured to store programs and data during operation of the system 100. Generally speaking, the memory 330 can be of any suitable type (e.g., RAM and/or ROM, or other suitable memory) and size, and in some cases, may be implemented with volatile memory, non-volatile memory, or a combination thereof. In some examples, memory 330 can be a relatively high performance, volatile, random access memory such as a dynamic random-access memory (DRAM) or static memory (SRAM). In some examples, the memory 330 may include a device for storing data, such as a disk drive or other non-volatile storage device. The memory 330 can be organized into particularized and, in some cases, unique structures to perform the functions disclosed herein. These data structures may be sized and organized to store values for particular data and types of data.

In some cases, memory 330 may be configured to be utilized, for example, for processor workspace (e.g., for one or more processors 320) and/or to store media, programs, applications, and/or content for desks 110A-D on a temporary or permanent basis. In one example embodiment, the memory 330 stores changes in height data of the desks 110A-D to assess the effectiveness of a given desk and provide user-specific height recommendations. Thus, in some cases, a given processor 320 can identify a time to adjust a height of a desk 110A-D and provide a recommendation to the users 120A-D to re-position their desks 110A-D to improve their ergonomic health.

As shown in FIG. 3, the memory 330 stores a number of databases, for example a desk database 340, a user database 350, a mobile computing device database 360, and a reports database 370. Generally speaking, a database is a data structure that can be accessed, managed, and updated, for example by a processor, to store data records or files of information. In some examples, the processor 320 is also configured to control read/write access, specify report generation, and analyze usage. The data records and/or information may be stored in any logical construction capable of holding information on a computer readable medium including, among other structures, file systems, flat files, indexed files, hierarchical databases, relational databases or object-oriented databases. The data may be organized using relationships and indexes (e.g., groups of desks). The relationships and indexes may be established between the various fields and tables to ensure both data integrity and data interchange performance.

As can be seen in FIG. 3, the server computer 150 includes a desk database 340 configured to store data records and files for the desks 110A-D of the system. In general, the desk database 340 stores desk information and data. Desk information is any information associated with identification, configuration, operation, and usage of the desks 110A-D. Specifically, desk information can include desk locations, desk identifiers, desk groupings, desk statuses, desk settings, and desk operating thresholds. In some examples, the data may include times of operation, number of operations, duration desk movements, and electricity usage. In yet some other examples, the data may also include number of: status change requests received (total and on a per desk basis), authorized status change requests, and denied status change requests. The processor 320 can access information provided to the mobile computing device 130A-D that is utilized by the power management application to operate the desks 110A-D. In some examples, the desk database 340 includes a file system configured to store data and acts as a file server for other components of the server computer 150 (e.g., desk control interface 380 and analysis & reports engine 390).

The server computer 150 also includes a user database 350 configured to store data records and files for system users 120A-D. In general, the user database 350 stores information and data associated with a user's access and use of the system. In this one example, the data records or information can include: user identification numbers, the number of authorized users (e.g., logged at one time or a list of all persons who have access or permission to use the system), number of logins, and login times.

FIG. 3 also illustrates that the server computer 150 further includes a mobile computing device database 360 configured to store data records and files of the devices 130A-D. The mobile computing device database 360 stores information and data regarding the devices utilized to access the system. In this example, the data records and files may include mobile computing device identification numbers, device types, operating software, and web service API protocol information.

The server computer 150 also includes a reports database 370 that stores information and/or data records generated and outputted by one or more components of the server 150, such as an analysis and report engine 390, which is described further below. For example, the analysis and reports engine 390 can generate the following data records and information that can be stored in reports database 370: health reports (e.g., charts illustrating number of calories used), desk status reports (e.g., number of desks in active status), usage reports (e.g., graphs illustrating the number of users utilizing the system), and a list of authorized users. In some examples, data records and information generated and/or outputted by the desk control interface 380 and the user search engine 385 can also be stored within the reports database 370. The reports database 370 can also generate data records and information related to business intelligence, for example return on investment (ROI) and usage statistics.

In some examples, the processor 320 is also configured to execute one or more engines, such as the analysis & reports engine 390 to execute or otherwise perform system functions. Generally speaking, an engine is software that performs a core function for other programs. Engines can be used in operating systems, subsystems or applications to coordinate operation of other programs. In some instances, engines are a special-purpose program that uses rules, logic, and/or processes to manipulate data records or information.

The server computer 150 also includes an analysis and report engine 390 configured to compile information about the operation and performance of the system 100. In some examples, the information can be compiled into robust reports that can be utilized by other applications, such as MICROSOFT® excel or access, for data analysis. To accomplish this goal, in some instances, the analysis and reports engine 390 exchanges or otherwise transmits information with, for example the administer interface 310, the network interface(s) 315, the memory 330 (including databases 340, 350, 360 and 370), the power management service 375, the desk control interface 380, and the hoteling service 395, via the processor 320. Information may include any information that can be used in generating or distributing reports to components of the system. Specific examples of information include the number of users that have access to the system, the time in which user access the system, the number of desk operations, and the number of status change requests received, to name only a few. For instance, using information (e.g., the number of users that regularly log into the system) the analysis and report engine 390 can provide reports to the administrator 160 that identify underutilized desks 110A-D within the system 100. Based on such information, the administrator 160 can reallocate desk resources to improve system effectiveness. In some examples, the analysis and report engine 390 can transmit information to a central computer (e.g., one located at a corporate office or headquarters) regarding desk usage of employees at remote locations, for example employees that work at satellite offices or from home. In such examples, the engine 390 can generate a report that identifies sit and stand times of an employee working remotely. The engine 390, utilizing the processor 320 and network interface(s) 315, can transmit the report to a corporate office via network 140.

In at least one example, the server computer 150 includes a power management service 375 configured to coordinate the operation of the power-adjustable desks 110A-D to prevent overloading the electrical distribution system. To accomplish this operation, in some examples, the power management service 375 exchanges information with the network interface 315 and the memory 330 (including databases 340, 350, 360 and 370). This information may include any information that can be used monitor and/or manage operation of the desks 110A-D to prevent electrically overloading the system. Specific examples of information include requests to change desk status, listings of current desk statuses, and a desk operating threshold.

In one example that implements centralized control, the power management service 375 is pre-configured with a desk operating threshold (e.g., three desks in operation at one time) or receives it from the administrator 160 via the administrator interface 310. Examples of centralized control include system configurations, in which the server computer 150 authorizes operation of the desk 110A-D based on the status of other desks 110A-D within the system 100. For example, the server computer 150 interoperates with mobile computing device 130A-D, such that the power management service 375 receives one or more desk status change requests from the devices 130A-D via the network interface(s) 315 and the processor 320. With a desk status change request received, the power management service 375 determines whether or not to grant the request based on the status of other desks within that particular group. In one example, the power management service 375 determines whether to grant the request by implementing one or more processes and/or logic functions. The power management service 375 is configured to retrieve data records and/or information from memory 330 (including from databases 340, 350, 360, and 370) that is used to make the status determination. For instance, the power management service 375 may retrieve a current status of each desk 110A-D within the group from the desk database 340. Using the current desk statuses together with the desk operating threshold, the power management service 375 can determine whether to grant the received desk status change request, as described in the method illustrated in FIG. 7. In some other examples, the power management service 375 may direct the operation of the processor 320 to determine whether or not to grant the desk status change request, as described above.

In another example, that implements decentralized control, the power management service 375 is configured to receive requests (e.g., via the API described above with reference to Table 1) for information stored in the memory 330. Examples of decentralized control include system configurations, in which a component other than the server computer 150, for example the desks 110A-B or mobile computing devices 130A-D, authorizes the operation of the desks 110A-D. For instance, the mobile computing devices 130A-D (or in some examples, the desks) receive the requested information the power management service 375 and determine whether a desk status change can be enacted (and whether the desk can be adjusted). One example of a method executed by either the mobile computing devices (or the desks) is described further below with reference to FIGS. 12A and 12B.

In some examples, the server computer 150 and the desks 110 are configured to directly interoperate (i.e., without using the mobile devices 130 as proxies). In these examples, the server computer 150 further includes a desk control interface 380 configured to manage the operation of desks (e.g., the desks 110A-110D) within the system to prevent electrically overloading the system. To accomplish this operation, in some examples, the desk control interface 380 exchanges information (e.g., instructions and/or commands) with the power management service 375 and/or the network interface(s) 315. This information may include any information utilized to operate or otherwise adjust the power-adjustable desks 110A-D. Specific examples of the information include desk control instructions that comply with desk adjustment protocols and/or routines, desk status change requests, and desk operation authorizations. These desk control instructions may instruct a desk 110A-D to raise or lower its work surface.

In this one example, the desk control interface 380 receives a desk status change requests from the user via a user interface rendered via the network interface(s) 315. Examples of screens rendered by this user interface (as implemented by one of the mobile computing devices 130A-D), are described below with reference to FIGS. 6*a*-6*d* and 8-10. In response to receiving a desk status change request, the desk control interface 380 requests authorization from the power management service 375 to operate the desk 110A-D. The power management service 375 reviews the request (as previously described) and determines whether or not authorize or otherwise grant permission to operate the desk 110A-D. If authorization is received from the power management service 375, the desk control interface 380 generates and transmits (via the network interface(s) 315) instructions to adjust the desks 110A-D that can be received by the desks 110A-D. If, on the other hand, authorization is denied by the power management service 375, the desk control interface 380 is configured to send a notification to the user interface rendered via the network interface(s) 315 that the desk 110A-D cannot be adjusted at this time.

In some examples, the desk control interface 380 is configured to generate multiple desk status change requests to execute a program or a routine of height adjustments over a period of time. For example, a user 120A-D can select a sit-stand protocol selected by using the user interface rendered via the network interface(s) 315 to achieve a desired health goal (e.g., expend 300 calories a day). Upon receipt of the sit-stand protocol selection, the desk control interface 380 is configured to retrieve information from the desk database 340. Using the retrieved information, the desk control interface 380 periodically generates and transmits multiple desk status change requests to the power management service 375 to receive permission to adjust the desks 110A-D. In some examples, these requests can be transmitted together at one time to reserve times throughout a work shift or day, in which to adjust the desk 110A-D. In some other examples, the desk control interface 380 is configured to automatically transmit desk status change request at approximately the time indicated by the sit-stand protocol (e.g., 5 minutes before the time identified by the protocol).

Note that the operating instructions and notifications can be transmitted directly or indirectly to the desks 110A-D. When transmitted indirectly, the information is transmitted to the desks 110A-D via the mobile computing devices 130A-D, as described further below. In such instances, the mobile computing devices 130A-D act has a conduit or proxy for desks 110A-D that are not configured to transmit information directly with the server computer 150 (e.g., there is no network connection directly linking the server 150 to the desks 110A-D).

The server computer 150 also includes a hoteling service 395 configured to allow users to select or otherwise choose a particular power-adjustable desk from a group of power-adjustable desks. In some examples, once users have selected a power-adjustable desk 110A-D, the users can reserve that desk for a given period of time (e.g., a work shift or day). To achieve this goal, in some examples, the hoteling service 395 exchanges information with the network interface(s) 315 and the memory 330 (including databases 340, 350, and 360). This information may include any information used to determine whether a desk 110A-D is available or not. Specific examples of information include desk identifiers, user identification numbers, number of users currently accessing the system, and number of desks within the system, as previously described herein. In some examples, the user logs into the power management application using their mobile computing devices 130A-D to view which of the desks 110A-D are available before they come to work at an office. Once the user locates a desk 130A-D that is available, the application, in some examples, allows the user to reserve that particular desk 110A-D.

The hoteling service 395, in some examples, can be further configured to locate users 120A-D accessing the system 100. To perform this function, in some examples, the hoteling service 395 exchanges or otherwise transmits information via the processor 320 with the administer interface 310, network interface(s) 315, and the memory 330 (including databases 340, 350, 360 and 370). Information may include any information used to determine whether a user 120A-D is accessing the system. Specific examples of information include user identification numbers, the number of users that have access to the system, and number of users currently logged into the system. In some examples, the hoteling service 395 is configured to execute one or more processes and/or logic functions to locate a user logged into the system, for example a friend or co-worker at work. The processes and logic functions can be executed by the hoteling service 395 using information (e.g., a user's name, telephone number, or desk or desk group location) received via the network interface(s) 315 from a user's mobile computing device 130A-D. In some examples, the hoteling service 395 is configured to allow workers to dynamically schedule their use of a desk 130A-D. For instance, employees can log into the power management application using their mobile computing devices 130A-D to reserve a desk 110A-D before they come to work at the office.

Figure 4:
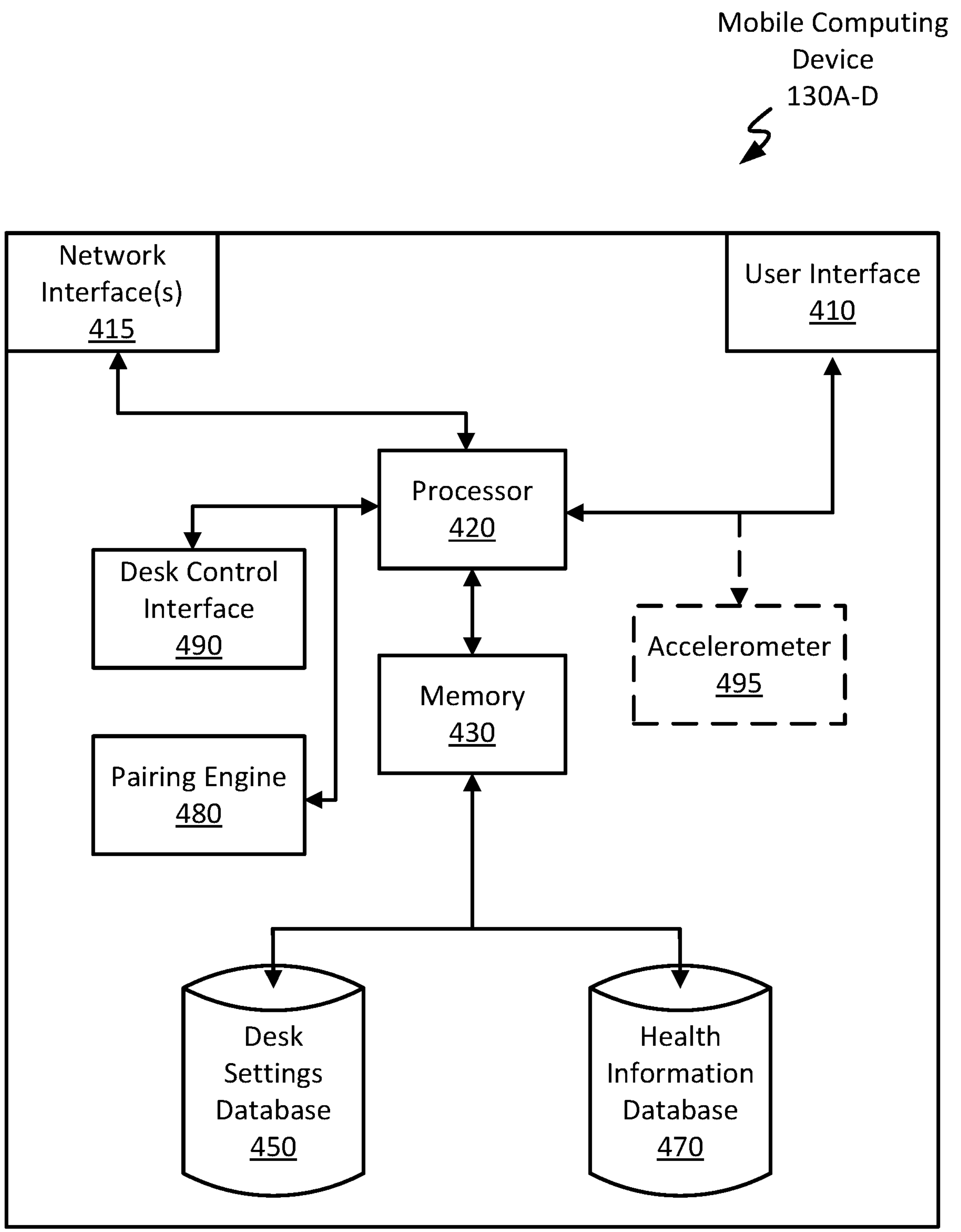
FIG. 4 is a block diagram of a mobile computing device configured to execute a power management application, in accordance with an embodiment of the present disclosure.

FIG. 4 is a block diagram of a mobile computing device 130A-D configured to execute the power management application, in accordance with an embodiment of the present disclosure. In one example, as shown in FIG. 4, the mobile computing device 130A-D includes a user interface 410, a network interface(s) 415, a processor 420, a memory 430, a desk settings database 450, a health information database 470, a pairing engine 480, and a desk control interface 490. In some other examples, the mobile computing device 130A-D may include more or less components, for example accelerometer 495 (indicated as optional by the dotted lines), depending on a given application. The network interface(s) 415, the processor 420, and memory 430 are similar to those components previously described herein in relation to FIG. 3.

The user interface 410 is executed by the at least one processor 420 and is configured to provide a user interface to the users 120A-D of the mobile computing devices 130A-D. In general, the user interface 410 allows a user 120A-D to operate a given adjustable desk 110A-D within the area. In one example, the user interface 410 is implemented as a specialized native application that is configured to interoperate with the server computer 150. In some other examples, the user interface 410 is configured to serve a browser-based user interface to the user 120 that is rendered by a web-browser running on a mobile computing device (e.g., a smart phone). In this one example, the user 120A-D exchanges user and/or system information with the server 150 via this user interface 410. User information may include any information about a user 120A-D that can be used to operate the adjustable desks 110A-D and stored within several databases of the server 150, as will be described further herein. Specific examples of user information include application instructions, desk setting preferences, sit-stand protocols, and health information. The user 120A-D can also exchange system information via the user interface 410. System information can include desk information and mobile computing device information, and is described further below with reference to FIG. 7. Although the example described above focuses on a web-based implementation of the user interface 410, examples are not limited to a web-based design. Numerous other use cases will be apparent in light of this disclosure.

As shown in FIG. 4, the desk control interface 490 is configured to operate as does the desk control interface 380 described above with reference to FIG. 3. However, in some examples, the desk control interface 490, is further configured to place the desk in active status or maintain it in inactive status, depending on whether the status change request is granted or not and/or depending on whether the mobile computing device 130A-D is able to contact the power management service 375. Further, the desk control interface 490 is configured to render its user interface via the user interface 410 (rather than the network interface(s) 315) and is configured to retrieve information regarding desk settings from the desk settings database 450 (rather the desk database 350). The presence of local data sources notwithstanding, the desk control interface 490 may, in some examples, retrieve information from remote data sources (e.g., the desk database 350).

As illustrated in FIG. 4, the memory 430 stores a number of databases, for example a desk settings database 450 and a health-information database 470. As previously described herein, a database is a data structure that can be accessed, managed, and updated, for example by a processor 320, to store data records or files of information. As shown in FIG. 4, the mobile computing device 130A-D includes a desk settings database 450 configured to store data records and files that provide instructional information about how to operate the desks 100A-D. In this one example, the data records and information can include instructions to maximize the health benefits received by a user 120A-D while using the desks 110A-D. In a specific example, the information can include optimal or best times to sit or stand, how often to adjust user position, and how to position the desk in both sitting and standing positions. In some examples, the information can include instructions that teach a user how to operate the desk. In particular, the information can include illustrations or videos demonstrating how to use one or more features of the desk, instructions regarding how to download and access the application using the mobile computing device, instructions about how connect to the network, instructions about how to reset desk settings, and instructions for performing a desk height adjustment using the power management application.

In some examples, the desk settings database 450 is further configured to store data records and files related to particular heights of the desk. In this one example, the data records and information can include pre-programmed heights at which the desk can be adjusted to. In particular this information can be general or user-specific information. For example, general information can be a maximum height and a minimum height of the desk that applies to all users of the system. On the other hand, user-specific information can include a sitting position height and a standing position height generated for a particular user. In some examples, the data records and information is based on the National Health & Nutrition Examination Survey (NHANES) information.

The desk settings database 450, in some examples, is further configured to store data records and files for performing multiple desk height adjustments. Generally speaking a sit-stand protocol is a routine or a series of desk height adjustments that are pre-programmed or otherwise selected to be executed over a defined period of time to achieve an ergonomic benefit. For example, a sit-stand protocol can include sitting for 40 minutes (min) and then stand for 20 min over the course of a given hour. In another example, the sit-stand protocol can include sitting for 20 min, and then followed by 8 min of standing and 2 min of walking for every half-hour. In this one example, the data records and information can include any information used to generated or modify a sit-stand protocol. Specific examples of information include portions or entire protocols, protocol durations, and times in which to execute protocols.

The mobile computing device 130A-D further includes a health information database 470 configured to store data records and files related to health information for a given user. In general, health information can be any information used to generate a health profile for a user 120A-D. A health profile is information related to a user's health (e.g., body dimensions) that can be used to set or otherwise adjust a position of desks 110A-D. In some cases, the health profile may also include health goals (e.g., burn 300 calories a day while using desks 110A-D) that a user 120A-D that inputted by the user 120A-D or automatically generated based on the health profile. In this one example, the data records and information can include a user's body measurements (e.g., height and torso length). In some examples, the health information database 470 may include tracking or history information regarding one's health over time. This information can then be displayed to the user as a progress chart that illustrates a user's progress towards a personal health goal.

As can be seen in FIG. 4, the mobile computing devices 130A-D further include a pairing engine 480. The pairing engine 480, in some examples, is configured to execute instructions and/or commands to establish a network connection between the mobile computing devices 130A-D and one or more devices of the system 100, for example the server 150. In one example, the pairing engine 480 receives data records and/or desk identifier information (e.g., a QR Code) from the users 120A-D via the user interface 410. In some other cases, the desk identifier information is provided using the method illustrated in FIG. 11, as later described herein. Other information, such as the available networks in the area, is provided by the network interface(s) 415. The engine 480 uses the received information to generate and transmit a request to establish a network connection with one of the available networks (e.g., network 140) that is received by the server computer 150, as previously described herein. In some examples, the pairing engine 480 automatically re-establishes a previous network connection, for example when a user has a left the desk 130A-D and then subsequently returned to the same desk at another time. The pairing engine 480, in some examples, may direct or otherwise instruct the processor 420 to generate a request for a network connection as described above.

In some examples, the mobile computing device 130A-D includes an accelerometer 495 configured to detect motion of the device 130A-D. The accelerometer 495 may be any type of accelerometer configured to measure changes in velocity of the mobile computing device 130, such as, semiconductor, electromechanical, capacitive, piezoelectric, piezoresistive or Hall Effect accelerometers. No matter its type, the accelerometer 495 generates an output signal in response to detecting movement of the mobile computing device 130A-D. The output signal can be used to perform a variety of system functions. For example, the output signal from the accelerometer 495 can be transmitted via the processor 420 to the device pairing engine 480. The engine 480 can be configured to use the output signal to pair or otherwise establish a network connection between the mobile computing device 130A-D and a desk 110A-D, as described herein in relation to FIG. 11. In other examples, the output signal from the accelerometer 495 can be used to evaluate desk performance (e.g., measure adjustment times) and/or perform troubleshooting procedures (e.g., identify when the desk is moving).

Figure 5:
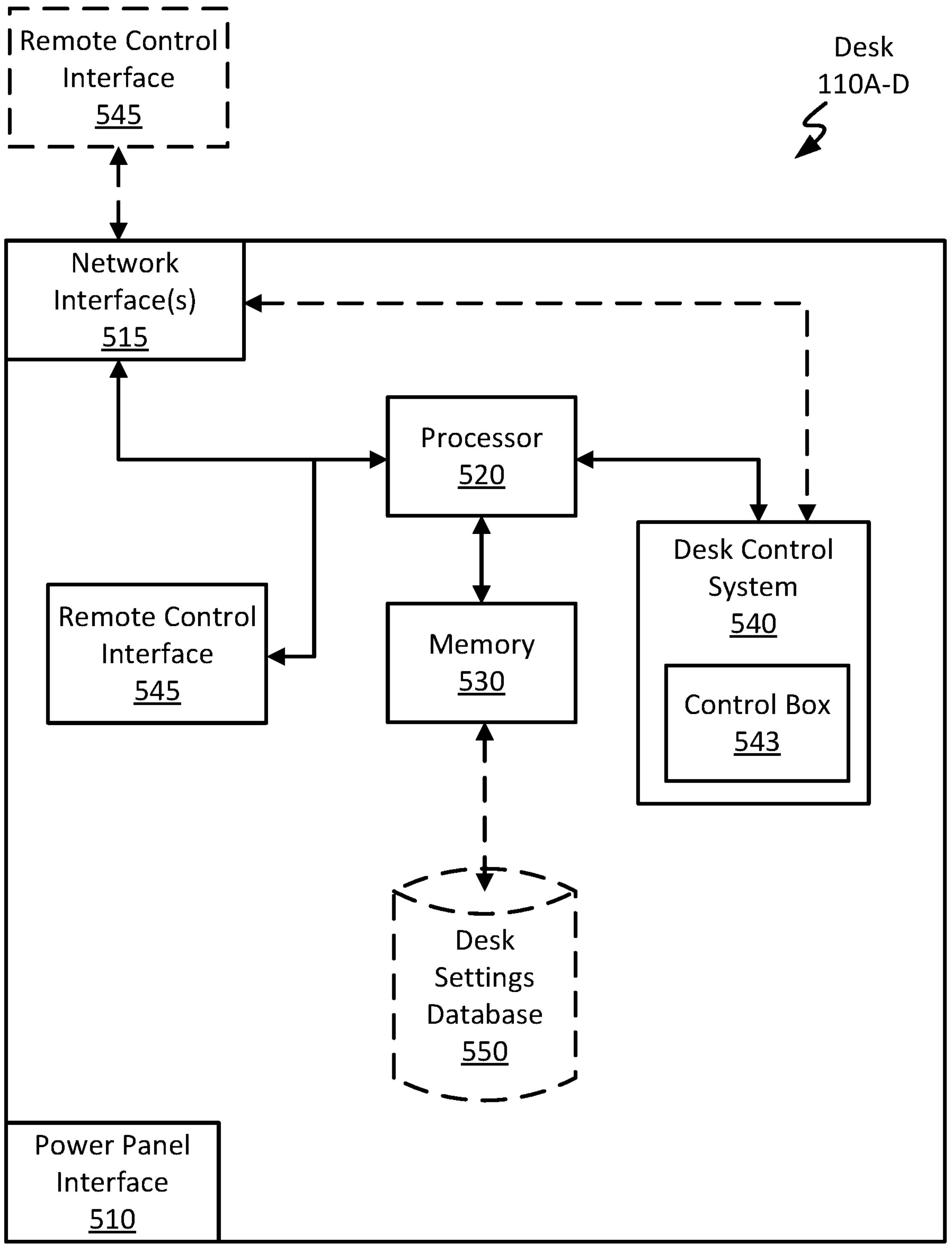
FIG. 5 is a block diagram of a power-adjustable desk configured to be adjusted using a power management application, in accordance with an embodiment of the present disclosure.

FIG. 5 is a block diagram of an adjustable desk 110A-D that is adjustable using a power management application, in accordance with an embodiment of the present disclosure. In one example, as shown in FIG. 5, the desk 110A-D includes a power panel interface 510, a network interface(s) 515, a processor 520, a memory 530, a desk control system 540, and a remote-control interface 545. In some examples, the desk 110A-D may optionally include a desk settings database 550 (as indicated by the dotted lines). The processor 520, the memory 530, the network interface(s) 515, and the desk settings database 550 are similar to those previously described herein in relation to FIGS. 3 and 4.

The adjustable desks 110A-D include a power panel interface 510 configured to receive electrical energy from the power panel 170 and distribute that energy to one or more components of the desk 110A-D, such as the processor 520 and desk control system 540. In general, the power panel interface 510 is an electrical connection (e.g., an electrical receptacle) that connects the desk 110A-D to an electricity supply, for example the power panel 170. In some examples, the power panel interface 510 is an electrical socket configured to receive a plug attached to an electrical power cord. In other examples, the interface 510 is one or more electrical connections (e.g., a junction box) in which electrical conductors are physically attached to one or more electrical wires and/or components of the desk 110A-D.

As shown in FIG. 5, the desks 110A-D further include a remote-control interface 545 configured for receiving and processing remote control commands from either of the desk control interfaces 380 and 490 resident on the server 150 and/or the mobile device 130A-D. To accomplish this function, in some examples, the interface 545 exchanges or otherwise transmits information via the processor 520 with the network interface(s) 515, and the memory 530 (including database 550). Information may include any information used to control or otherwise adjust the height of the desks 110A-D. Specific examples of information include desk adjustment information, desk settings, sit-stand protocol information, and user alerts. In one example, the system 540 receives desk adjustment information from the server computer 150 via the processor 520 and network interface(s) 515. In some examples, the remote-control interface 545 may receive one instruction to make an adjustment from the mobile computing device 130A-D or server computer 150. In other examples, the interface 545 may receive multiple instructions at one time, such as part of a sit-stand protocol. Each instruction is executed at a particular time over a defined period of time (e.g., a work shift or day) in accordance with the protocol. The remote-control interface 545 can be integrated into the desk 110A-D (as indicated by the solid lines in FIG. 5) to interoperate and/or be executed by other components of the desk 110A-D (e.g., the processor 520). In other examples, the remote-control interface 545 can be separate and distinct component from the desk 110A-D (as indicated by the dashed lines in FIG. 5). In particular, the remote-control interface 545, in some examples, can be a BLUETOOTH® dongle that is received (e.g., plugged into) or otherwise connected to the network interface 515. In such examples, the remote-control interface 545 exchanges information with the desk control system 540 via the interface 515 (as indicated by the dashed lines) to pair to the desk 110A-D to the network.

In some examples, the remote-control interface 545 is further configured to establish a connection between the adjustable desk 110A-D and mobile computing devices 130A-D via local networks 135A-D. In one example, the interface 545 receives data records and/or information from the mobile computing devices 130A-D via the mobile computing device interface 515 and processor 520. The interface 545 uses the received information to verify a request to establish a network connection with a mobile computing device 130A-D. Once verified, the remote-control interface 535 executes instructions and/or commands to establish a network connection between the desk 110A-D and the mobile computing device 130A-D. In some examples, the interface 545 may direct or otherwise instruct the processor 520 to verify a request and establish the network connection.

The adjustable desks 110A-D further includes a desk control system 540 configured to operate or otherwise adjust to the desk 110A-D. In one example, the desk control system can receive instructions and/or commands from the remote-control interface 535. In response, the system 540 is configured to transmit operational instructions and/or commands to a control box 543 that includes hardware and/or software configured to receive and execute instructions and/or commands from the mobile computing device 130A-D to adjust the height of the desk 110A-D. In some examples, the control box 543 can provide an electrical output of 24 Volts (V) at 2.5-5.0 amps of electrical current to operate one or more actuators. The control box 543, in some examples, is communicatively coupled to an actuator, for example a linear or rotational actuator, configured to raise and lower the work surface of the desk. In this one example, the actuator is an electric linear actuator that operates using 120 V, 60 Hertz of electricity. The control box 543, in some examples, can include one or more switches configured to automatically establish a connection directly between the mobile computing device 130A-D to the desk 110A-D. In particular, the switch can be configured to disable the remote-control interface 545 to allow the server computer 150 or desk 110A-D to control the operation of the desk 110A-D independent of the mobile computing device 130A-D.

In some examples, the desk control system 540 includes a desk control interface similar to the desk control interfaces 380 and 490. In these examples, the desk 110A-D may incorporate a local user interface (as described above) or may render a user interface via the network interface(s) 515 in a manner analogous to the desk control interface 380 relative to the network interface(s) 315. Moreover, the desk control system 540 may interact with a centralized power management service (e.g., the power management service 375) to gain the benefits thereof.

Power Management Application User-Interface Examples

Figure 6A:
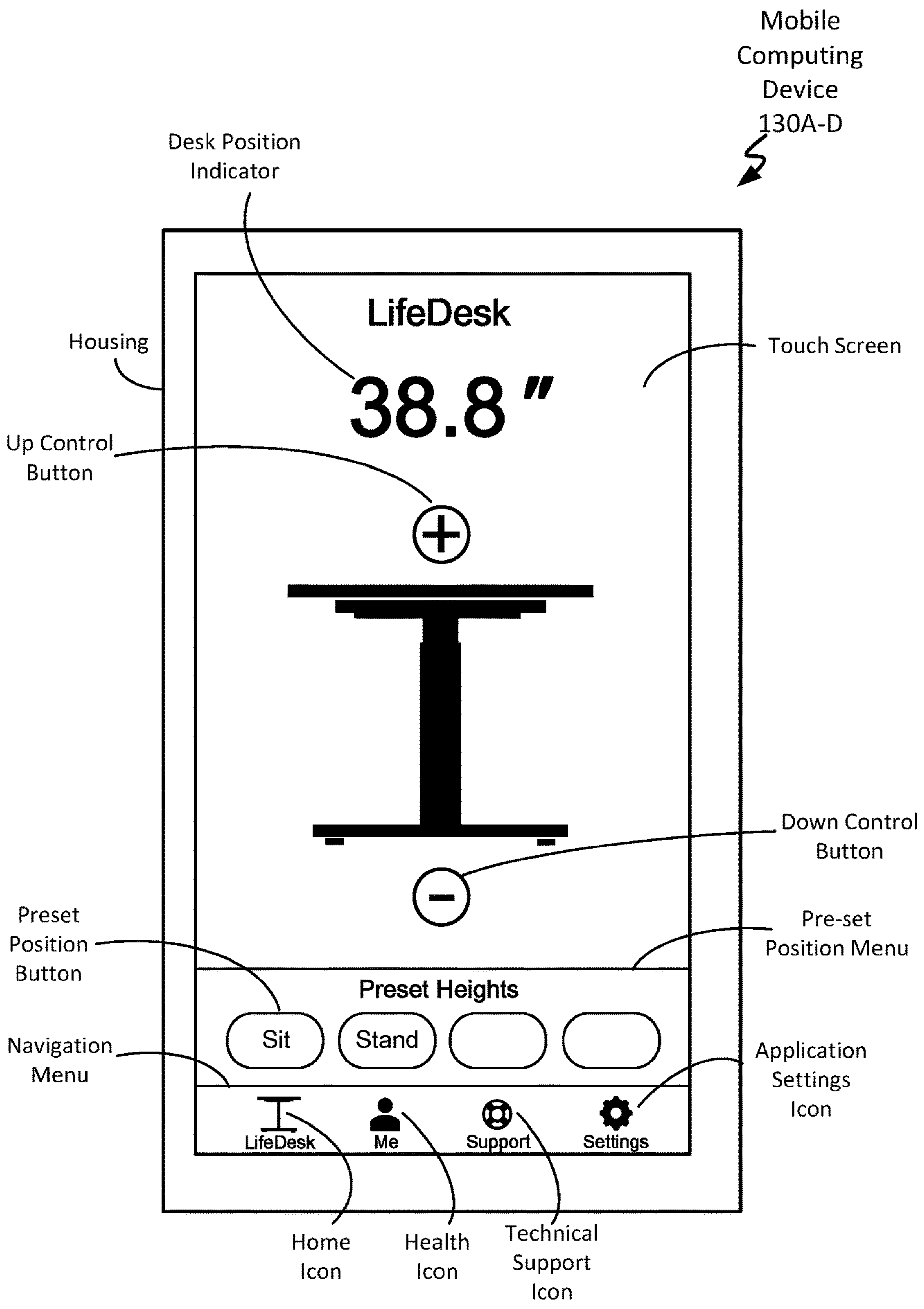
FIG. 6*a-d* illustrates an example user interface for a power management application of a touch screen device, in accordance with an embodiment of the present disclosure.

FIGS. 6*a-d* collectively illustrate an example power management application of a touch screen device, in accordance with an embodiment of the present disclosure. As can be seen in FIG. 6*a*, the device housing surrounds the touch screen of the device, and the device is displaying a user interface. In this one example, the user interface includes a position indicator (e.g., a numerical height) that indicates a height of the work surface of the desk relative to the floor. In other examples, the position indicator may include a scale (e.g., a vertical scale) that provides a visual reference of the relative height of the desk. In this example, the position indicator automatically updates in response to a change in height of the desk. In some other examples, the position indicator may also function as a warning indicator. In one such instance, the position indicator may flash and/or change color while the desk is in motion.

Below the position indicator are control buttons, for example up and down buttons, which are configured to adjust the height of the desk. In this one example, the control buttons are configured to adjust the desk incrementally (e.g., in 0.1" increments) in response to a tab gesture performed thereon. Adjusting the height of the desk using single increments may be preferred in some instances, where the user desires only a small height adjustment, for instance when a user is fine tuning his seating configuration. On the other hand, a press-and-hold gesture performed on the control buttons can adjust the desk in multiple increments (e.g., in 0.5" increments) or continuous increments to rapidly adjust the height of the desk. Multiple or rapid increment adjustments may be desirable when the user is initially configuring his work space (i.e., user has no preset height positions saved) or in instances in which the desk is repositioned to perform maintenance (e.g., lowering the desk to the fully down position to remove it). In some other examples, the control buttons can be combined into a single toggle or slide button configuration. In such instance examples, the height of the desk is adjusted in response to a swipe gesture performed on the toggle button. In some other examples, the user-interface may include a slider control or ruler or graphics (e.g., a graphic of a desk) that a user manipulates, for example by dragging, sliding or tapping, to control the operation of the desk.

Below the up and down control buttons is a pre-set position menu that provides a plurality of pre-set position buttons to adjust the height of the desk to pre-determined position. In one example, the pre-set menu is presented upon opening the application. In other examples, the user may perform a tap gesture (e.g. in the area above navigation menu within the touch screen display) to present the pre-set position menu to a user. In other cases, pre-set position menu is configured to expand and collapse, in response to a swipe gesture. For example, in some instances, the user may wish to enlarge the pre-set position menu so that the menu can easily be viewed or to display additional pre-set position buttons not currently visible on the touch screen display. In yet other configurations, the pre-set position menu can be scrollable so that pre-set position buttons not currently displayed (e.g., pre-set position buttons four, five, six, and seven) can be displayed on the touch screen display. In such configurations, a user can perform a swipe gesture (e.g., a horizontal swipe gesture) on the pre-set position menu to cause the menu to scroll in a direction of the gesture (e.g., in a left or right direction).

Within the pre-set position menu are one or more pre-set position buttons. The pre-set position buttons, in response to a user input, such as a tap gesture, automatically reposition the desk. Thus, using the pre-set position buttons the desk 110A-D can be automatically adjusted in response to a single user input. In this one example, the pre-set buttons are created within the pre-set position menu in response to a press-and-hold gesture performed on a blank or otherwise empty portion of the menu. As can be seen in FIG. 6*a*, the pre-set position menu includes four pre-set position buttons. Thus, the user can have multiple pre-selected positions for standing and/or sitting. In other examples, the pre-set position menu may include more or less buttons depending on a given application. The pre-set position buttons can be programmed or otherwise associated with a particular height setting using, for example a press-and-hold input performed on one of the buttons. In this one example, a press-and-hold gesture held for a period of time (e.g., 5, 10, or 15 seconds) saves a current height of the desk and associates that height with that button receiving the gesture. In some other examples, the pre-set position buttons are configured, in response to a double tap gesture on the button, to present edit window, in which the user can manually enter a pre-set height or otherwise change a saved setting. Upon entering or saving a height, the pre-set position button may display an indication to notify the user that the button has been programmed. As can be seen in FIG. 6*a*, in this one example, two of the buttons (e.g., buttons displaying sit and stand)

indicate a pre-set position is associated with the buttons. The remaining buttons do not indicate a pre-set position, and thus have not been programmed with a desired setting. In some examples, the GUI may include, in addition to or in place of the pre-set position menu, a recommended height tool. In one example, the recommended height tool may include a system prompt (e.g., a pop-up menu) in which users can enter their height. The tool can be further configured to suggest optimum sit and stand positions for the user. These positions can be saved as pre-set setting, for example to a pre-set button setting of the pre-set position menu.

The touch screen display also includes a navigation toolbar having a number of icons for accessing features of the application. In this one example, the navigation toolbar includes a home icon which displays the operation screen (i.e., the screen shown in FIG. 6*a*), a health icon shown as a person, a technical support icon shown as life preserver, and a settings icon represented by a gear. The health icon, in response to a gestured (e.g., a tap or press-and-hold gesture) performed thereon, displays health information to the user. The health information can be general information, such as instructional videos or documents that promote better ergonomic health. In particular, general health information can include pictures (e.g., a standard ergonomic positioning diagram) or videos of key stretches for various parts of the body including hip flexors, hamstrings, neck, shoulders, wrists, and forearms that can be easily accomplished in the work or office space. In some examples, the application can provide a daily health tip or health articles related to ergonomic health, and in particular best practices in the work place.

In some examples, the application provides personalized health information to the user. For example, the application can be integrated with one or more wearable devices (e.g., a FITBIT® or APPLEWATCH®) to provide health information that is related to the user's particular activities while using the adjustable desk. Personalized information may include total time sitting at the desk, total time standing, and number of transitions between sitting and standing. In some examples, the user can input wellness or health goals, such as number of steps taken per day, into the application. Using data from the wearable device (e.g., from a step counter integrated within the wearable device), the application can provide users with information about their progress related to inputted health goals. In some examples, the personalized health information can further include a number of calories expended (e.g., over a period of a day, week, month or year), graphs illustrating calorie estimates, and hydration data. The application can be configured to present the personalized health information to the user utilizing progress charts or graphs (e.g., pie charts, or bar and line graphs), that visually illustrate a user's progress towards wellness goals.

The navigation toolbar further includes a technical support icon that allows a user to receive technical information regarding operation and maintenance of the adjustable desk. In this one example, the user can receive operating instructions for the desk (e.g., a technical manual, instructional videos, and training materials) to facilitate the proper ergonomic use the desk, in response to a tap gesture performed on the support button. In other examples, the user can receive troubleshooting information (e.g., error code listings, installation instructions, and desk diagrams) to identify a problem with the desk and/or application. In yet other examples, the user can access remote technical personnel that can assist the user with a problem. The technical support icon, in some examples, can also provide ergonomic information to a user (e.g., instructional videos or literature) or otherwise assist the user with determining an ergonomic position of the desk (e.g., performing height adjustment calculations).

The navigation toolbar further includes a settings icon that is configured to enable a user to adjust one or more parameters of the application and/or adjustable desk operation. In this one example, the user can perform a tap gesture on the settings icon to adjust a configuration of the user interface. The user can use the settings icon to enter his/her information (e.g., height, torso length, etc. . . . ) and the application can automatically determine a desk position. In some other examples, users can be prompted to enter their information using the recommended height tool previously described herein. In particular, the application can determine desk heights that are proper ergonomic sitting and standing positions based on the National Health & Nutrition Examination Survey.

Figure 6B:
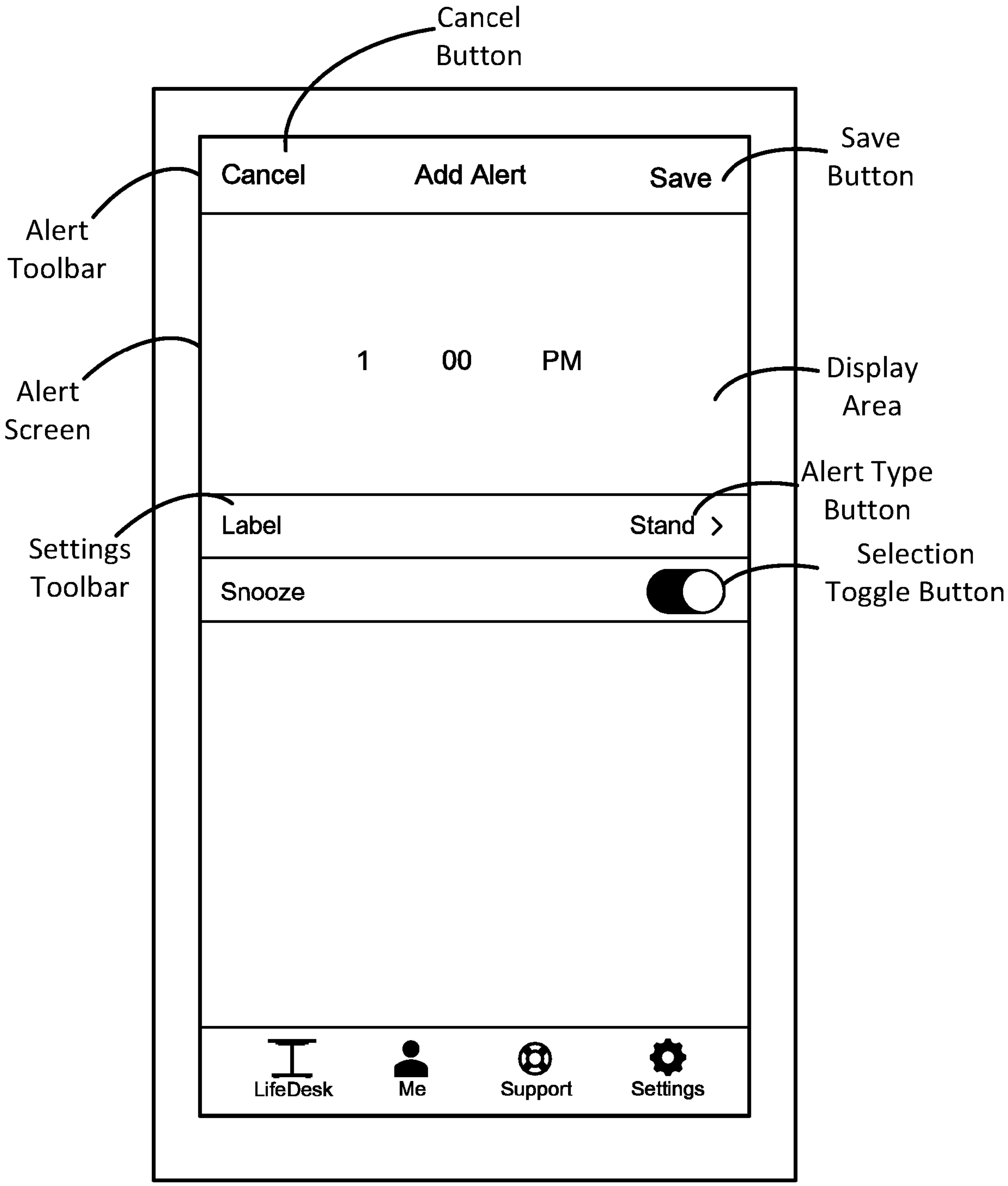

The settings icon, in some examples, can be configured so that a user selects or otherwise programs alerts that notify the user when it is time to adjust their position. In one example, as shown in FIG. 6*b*, the interface provides an alert screen that includes alert tool bar. The toolbar allows a user to create an alert and/or modify existing alerts. The alert toolbar includes a plurality of function buttons, such as a cancel and save buttons, configured to receive a user input, such as a tap gesture. The cancel button allows a user to discard changes made in the alert screen, and causes the application to exit the screen. If the user is creating a new alert, then the user can save or otherwise add the alert to the application by selecting the save button. For modifications made to existing alerts, the user can use the save button to store those changes. In some examples, the alert toolbar can further include an add alert button to create a new alert. As can be seen, the alert screen also includes a display area that is configured to present potential times in which to set the alert. A user scrolls through the times presented in the display area, for example by performing an upward or downward scrolling gesture, to select a particular time for the alert. Next, a settings toolbar is presented below the display area to allow a user to customize the alert. For instance, using the alert type button, the user can select the type of alert message (e.g., standing versus sitting alert message). The user can also set a snooze option using the selection toggle button (e.g., by performing a horizontal swipe gesture on the toggle button). When set, the snooze function allows the user to dismiss a displayed alert and have the alert repeat automatically at a subsequent time (e.g., five or ten minutes). Otherwise, when the alert is presented, the user dismisses the alert with a user input performed on the alert pop-up window or by selecting the settings icon. With the alerts created, the desk control interface 490 automatically presents the alerts at the pre-determined times (as selected in a fashion described above) in which to perform a desk height adjustment. These alerts are displayed to the user via the processor 420 and user interface 410, as will be described in FIG. 6*d*. Other graphical user interface examples for the power management application will be apparent in light of the present disclosure. For instance, the buttons and toolbars of the disclosed GUI can be rearranged or reorganized into different menu configurations, such as a hamburger menu.

Figure 6C:
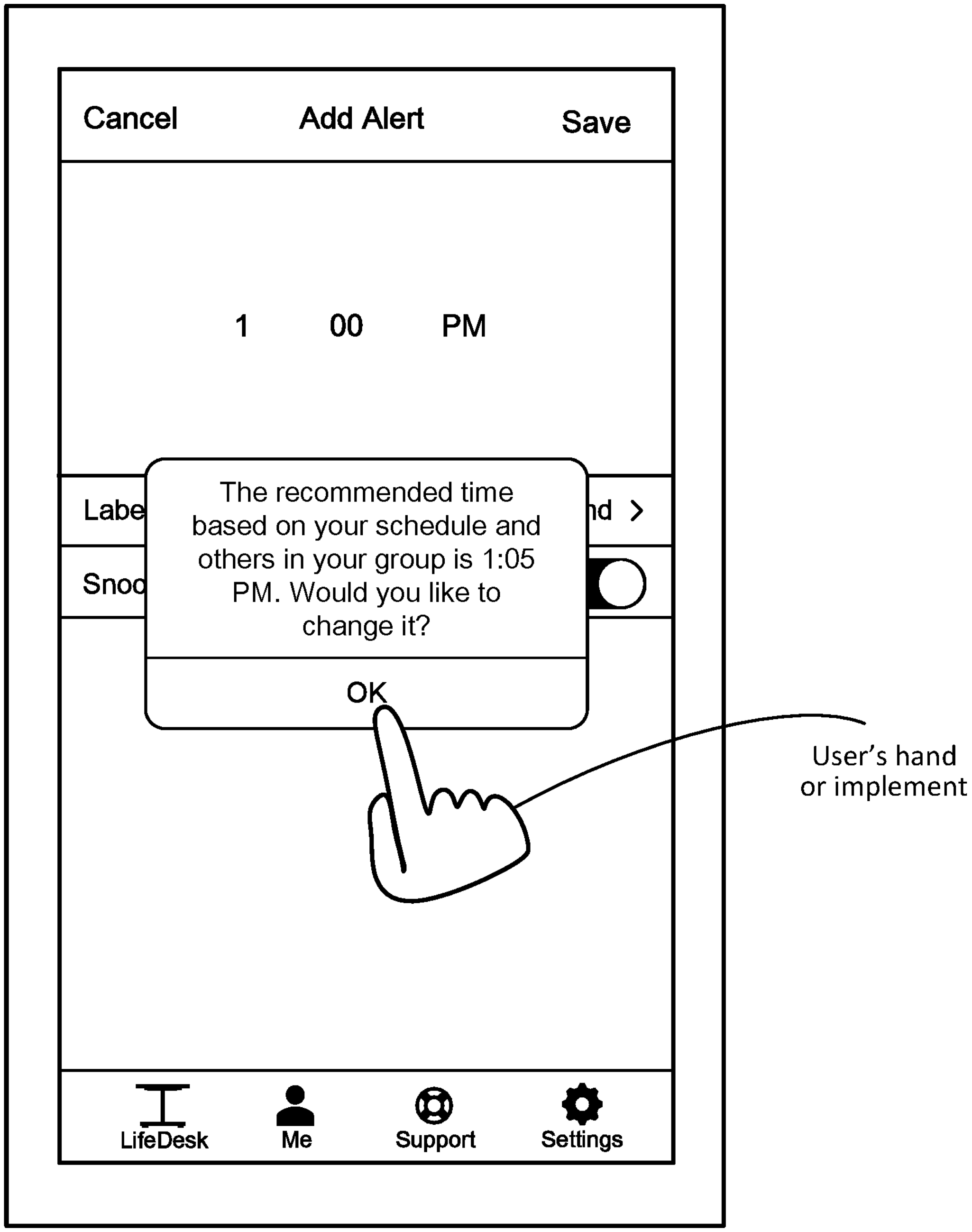

The desk control interface 490, in some examples, can be further configured to verify whether a newly added alert, or a modified alert, conflicts with alerts for other users of the system before saving or otherwise storing the new or modified alert. For instance, the mobile computing device 130A-D, in some examples, can send the proposed alert (e.g., new or modified alert) to the server computer 150. The server computer 150 verifies the alert by comparing it to other scheduled times in which other users are operating their desks. If the alert would cause the number of active (or locally running desks) to be greater than the desk operating threshold, then the server 150 communicates that information back to the mobile computing device 130A-D. In response, the interface 490 can propose another time in which to schedule the alert, for example as shown in FIG. 6*c*. In other cases, the system 100 can simply identify an overlap between the proposed alert and another alert (e.g., both alerts schedule for the same time, such as 1:00 p.m.), and the desk control interface 490 can suggest another time for the proposed alert to reduce the likelihood of overlapping activity. In yet other cases, the mobile computing device 130A-D may receive information from the server computer 150 regarding scheduled alerts for all the users within a group. Using this information, the mobile computing device 130A-D can determine, as described above, whether or not a proposed alert created by the user may cause overlapping or conflicting activity.

Figure 6D:
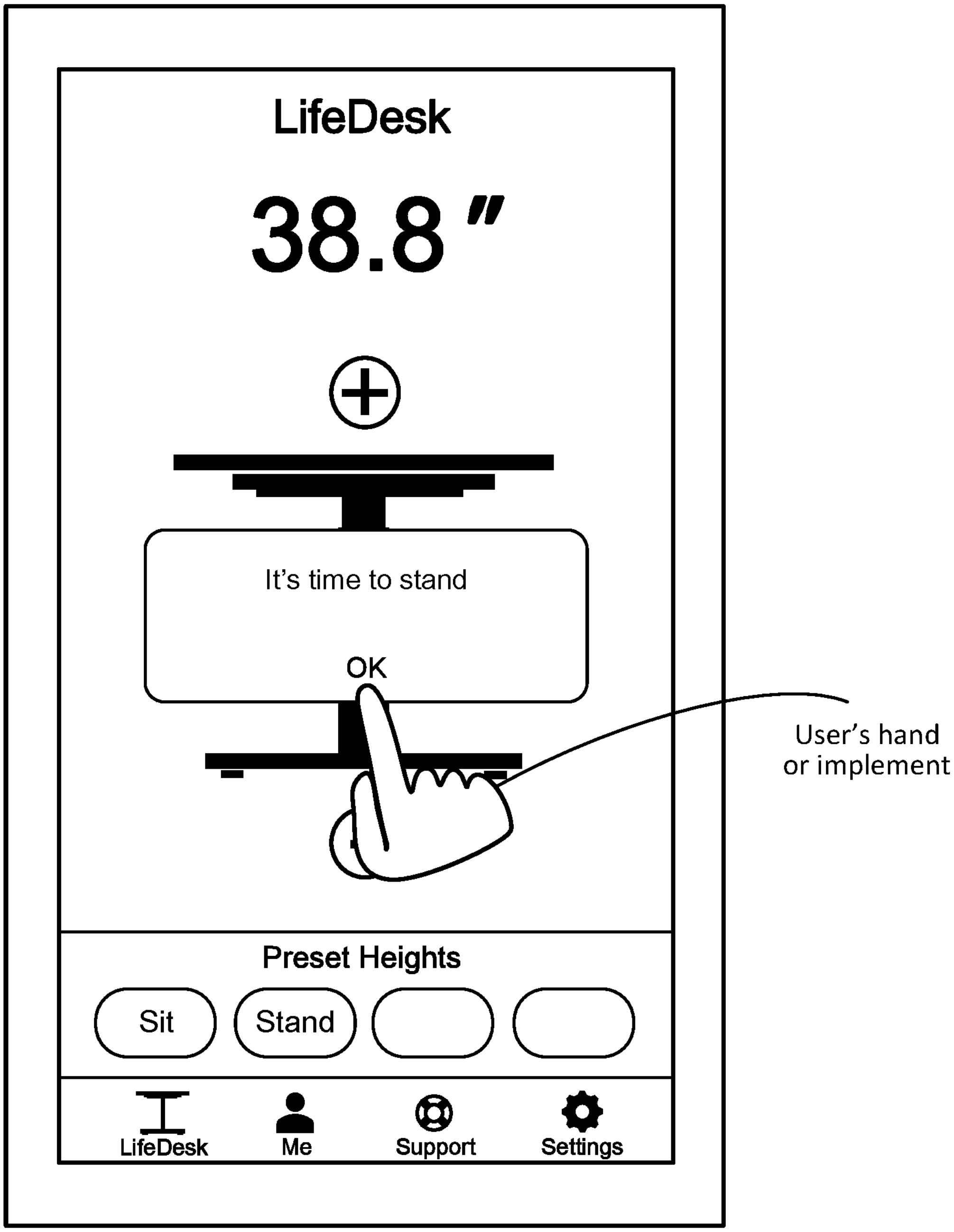

In some examples, the user can also select or otherwise associate two or more alerts to create a health protocol in response to performing a gesture on the settings icon. A health protocol is a programmed series of alerts that when executed instruct the user to adjust desk and/or body position to promote ergonomic health. The user can manually create a health protocol can be creating two or more alerts, as described above, and executing them over a period of time (e.g., a work shift or day). In some examples, the health protocols are preprogrammed within the application, and a user can select one from a menu or sub-menu of protocols using the settings icon. In one example, the health protocol is an eye-fatigue protocol, such as the 20-20-20 rule, in which ever every 20 minutes the user is reminded to take a 20 second break (e.g., by receiving an alert) and focus on an object located 20 feet away. The health protocol, in other examples, can be sit-stand protocols that remind users to adjust his/her position throughout the course of a day (e.g. on a half-hour or hourly basis). In one instance, the sit-stand protocol can remind the user to stand after 40 minutes of sitting, as, as shown in FIG. 6*d*. The user can dismiss or otherwise acknowledge the alert by performing a gesture, such as a tap gesture, on the alert to remove it from the touch screen. After 20 minutes of standing, the user then receives another reminder that informs him/her that they can sit, if desired. In some examples, the sit-stand protocol can instruct the user to sit for 20 minutes, stand for 10 minutes, and walk for 2 minutes.

The settings icon can also be configured to adjust or otherwise reconfigure the user interface to allow the user to customize the appearance of the interface. In one example, using the settings icon, the user can change the color, size, or position of any of the features, such as the buttons, menus, or toolbars, displayed therein. In some examples, the user can add features, such as the time, date, health goals, and progress charts, which can be presented within the user interface.

An Example Methodology for a Power Management Application

Figure 7:
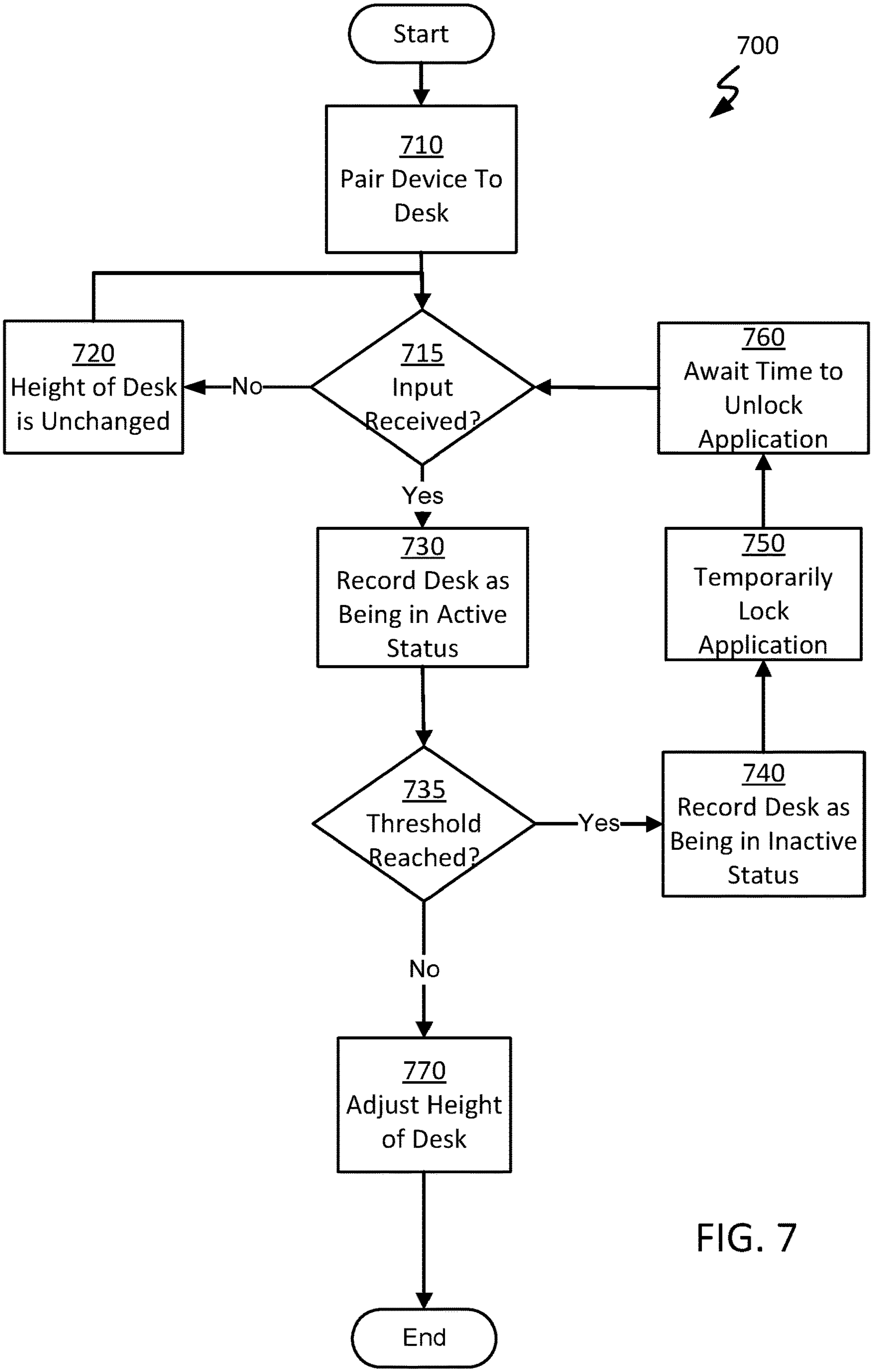
FIG. 7 is a flowchart illustrating an example method of operating a plurality of power-adjustable desks using a power management application, in accordance with an embodiment of the present disclosure.

FIG. 7 is a flowchart illustrating an example method 700 of operating a plurality of adjustable desks using a power management application, in accordance with an embodiment of the present disclosure. As described below, some of the steps of the method 700 can be accomplished by the server computer and the mobile computing device collectively or individually, depending on a given application. The method 700 includes pairing 710 a mobile computing device to the adjustable desk. In general, pairing or linking is the establishment of a connection between a first device (e.g., a transceiver within the desk) and a second device (e.g., a wireless device, such as a smart phone). In this one example, users install the power management application on the mobile computing device. The user using the application can pair the device to the desk by establishing a connection to a network, for example a BLUETOOTH® network utilizing, for example, the pairing engine 480, as previously described herein. The user establishes the network connection by entering or otherwise recording an image of a password or QR code displayed on a sticker attached to the desk. In other examples, the user can initiate a pairing routine or subroutine, in which the application connects to a desk, such as the pairing method shown in FIG. 11.

Figure 8:
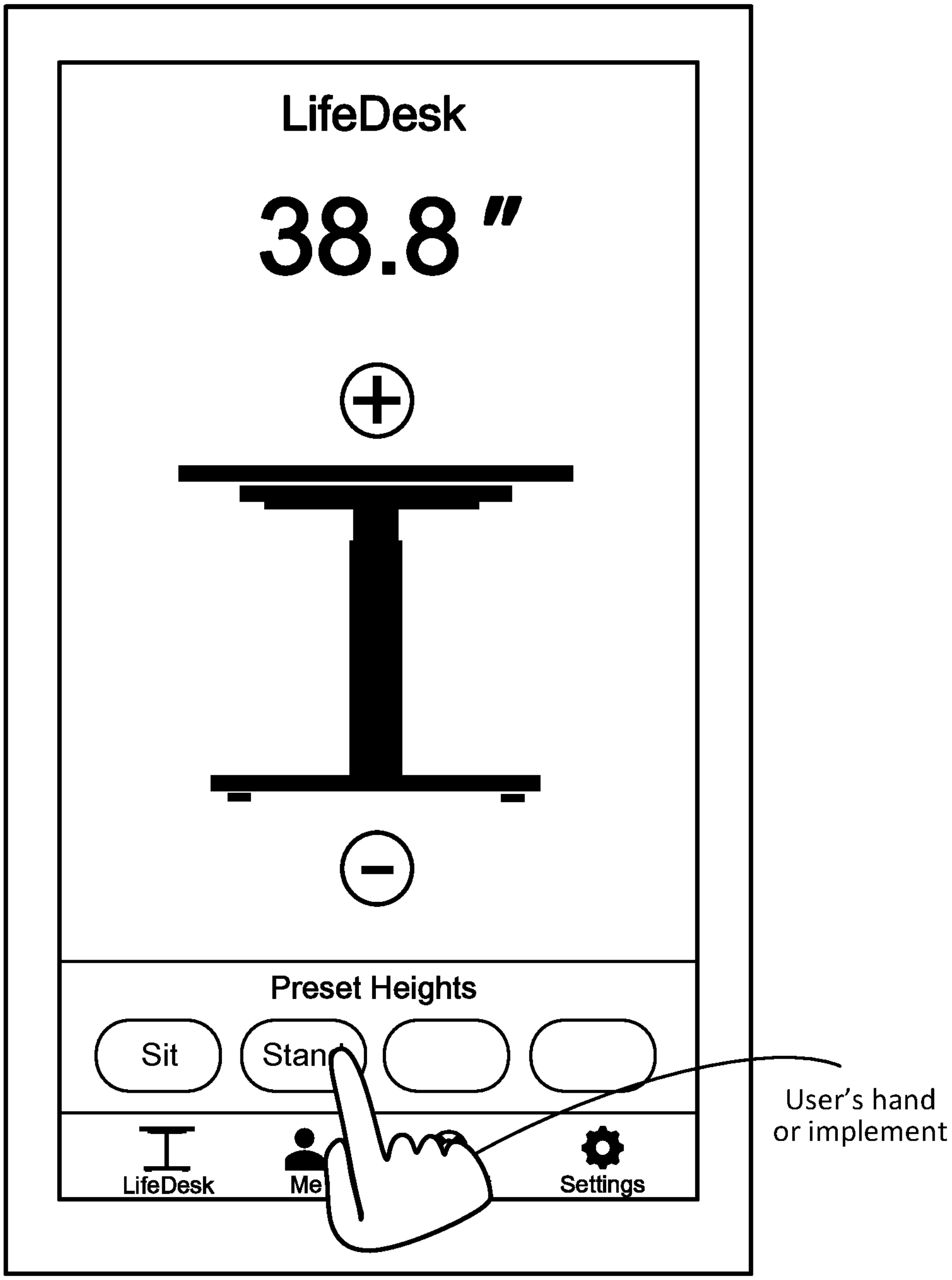
FIG. 8 illustrates an example user interface for a power management application of a touch screen device, in accordance with another embodiment of the present disclosure.

Once paired with the desk, the mobile computing device can be used to adjust the position of the desk. A change in height of the desk is accomplished in response to receiving 715 a user input via the user interface of the power management application. The user input can be any input, received on the touch screen of the mobile computing device, using a finger or any other suitable implement. In this one example, as can be seen in FIG. 8, the user provides an input on touch screen by performing a quick tap gesture (e.g., lasting less than one second) on the touch screen device to adjust a position of an adjustable desk associated with the device. As shown, the user input is performed on the pre-set button of the pre-set position menu. Alternatively, the user can adjust the desk by selecting one of the up or down control buttons provided above the pre-set position menu. No matter the fashion in which the user input is provided, the input is processed by, for example, the user interface and processor of the mobile computing device, as previously described herein.

If the user interface receives no user input then the height of the desk is unchanged 720. To this end, the desk may not include any physical controls for adjusting desk position, and thus the user may be unable to manually operate the desk to change its position. This is particularly noteworthy, because the electrical power source the application is to know the status of each desk within the group to coordinate desk operations, and thereby prevent electrically overloading the system. Manually operating the desks using local controls causes uncoordinated desk movements. The uncoordinated movements are undetectable by the power management application since there is no communication with the system before the desks are manually operated. Thus, manual operation of the desks is likely to cause an electrical overload of the system because of the increased likelihood that multiple desks may be operated at one time due to their uncoordinated operations.

In response to receiving an input 715, the mobile computing device interoperates with the server computer to determine whether the desk can be adjusted. For instance, in some embodiments, the mobile computing device requests status information from the server computer via the power management service and determines whether the desk can be adjusted in view of the number of other desks currently being adjusted. One example of an embodiment that executes according to this configuration is described further below with reference to FIG. 12. In other embodiments, the mobile computing device requests permission to move the desk from the server computer and the server computer determines whether the desk can be adjusted in view of the number of other desks currently being adjusted. Other processing distribution schemes will be apparent in view of this disclosure.

If the desk can be adjusted, the server computer (and/or the mobile computing device) records 730 the desk as being in active status. In this one example, the server computer maintains each desk has a default status of inactive status. Inactive status indicates that the desk is not being adjusted. In this example, once the user provides an input on GUI of the mobile computing device, the desk is identified as in active status by one of the mobile computing device and the server computer. Before the application adjusts a height of the desk, the application is configured to request that the server computer change of status from inactive status to active status. The user can adjust the desk to a desire height in active status. In some examples, the application uses various web service API protocols to execution function calls (e.g., those defined above with reference to Table 1) for interoperating with the power management service 375. The computer server changes the desk's status and saves or otherwise records that status in the desk database. This function can be accomplished, for example by the power management service 375. In some examples, the change in status of the desk is also provided to the reports database. The change in status of the desk, in some other examples, can be determined by the mobile computing device (locally) and then reported to the server computer. For example, the mobile computing devices include a processor configured to retrieve and execute instructions and/or protocols of the desk control interface to generate and transmit a desk status change request that is received and processed by the power management service of the server computer, as previously described herein.

In this one example, the server computer confirms the status for the desk based on a desk operating threshold. A desk operating threshold is the number of desks within a particular group that can be operated simultaneously. As previously described, electrical codes limit the number of desk that can be operated using one electrical circuit. In this one example, each of the electrical circuits (e.g., electrical circuits A and B) is configured to operate one desk at a time based on the arrangement of the power panel and electrical connections. Thus, the threshold in this instance is one desk. The threshold in other applications can be different (e.g., two, three or four desks) depending on the capacity of the electrical circuit supplying electricity to the desks, the number electrical appliances connected to the electrical circuit, and configuration of the desks themselves. The threshold can be inputted into the server computer by the administrator using the administrator interface. In some examples, the server may be pre-programmed with a threshold during installation of the system. In some examples, the available desk status can be determined by the power management service of the server computer, as previously described herein.

Figure 9:
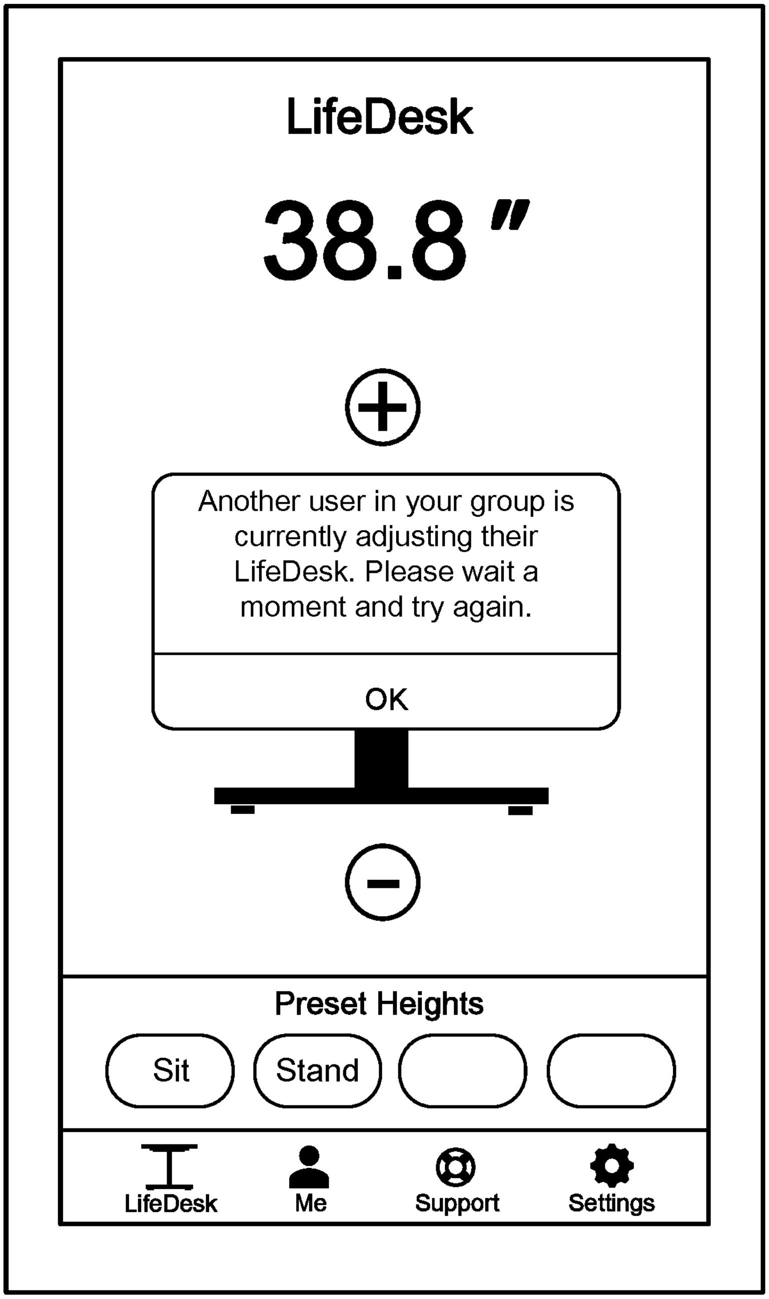
FIG. 9 illustrates an example notification for a power management application of a touch screen device, in accordance with an embodiment of the present disclosure.
Figure 10:
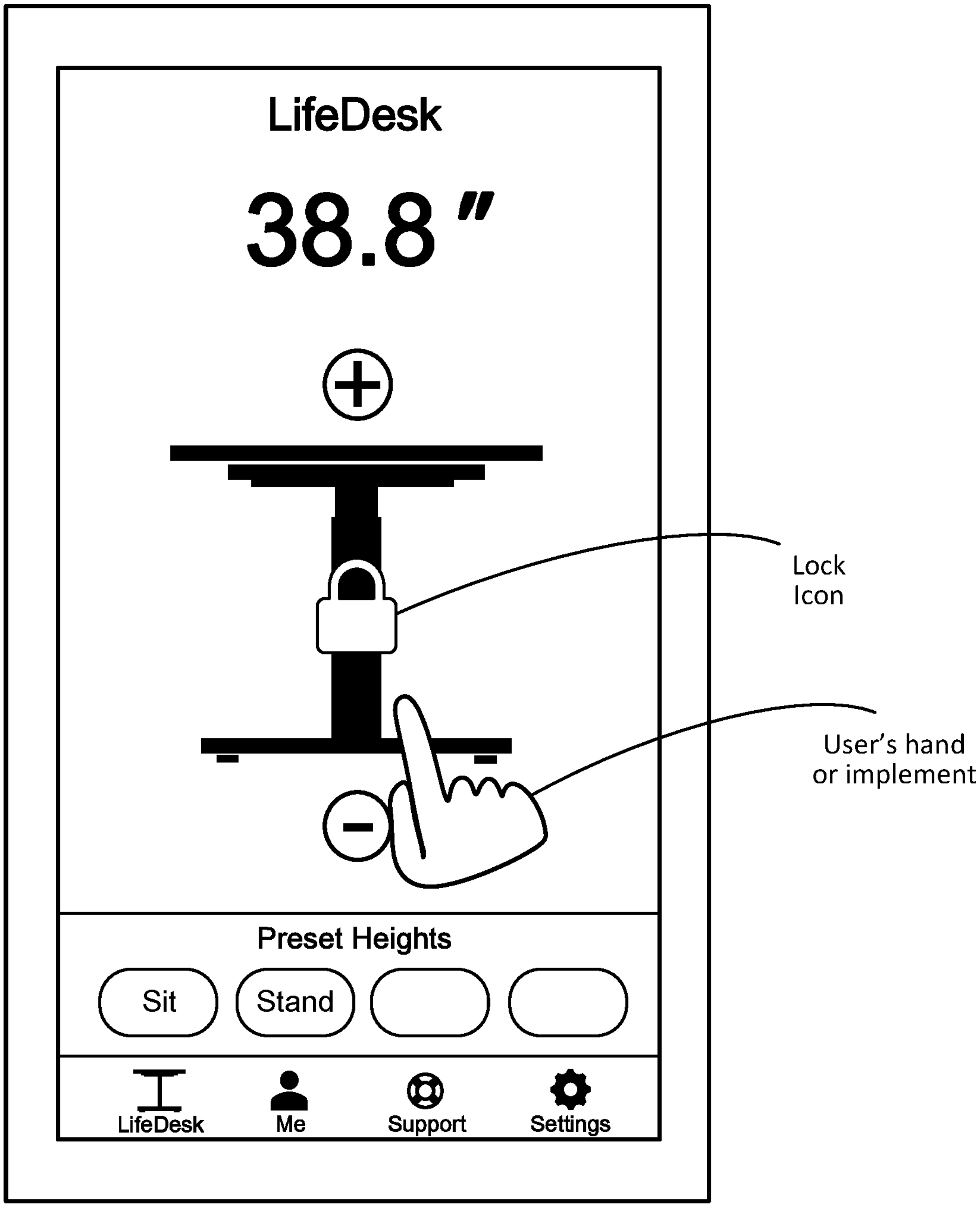
FIG. 10 illustrates an example of a locked user interface for a power manages application, in accordance with an embodiment of the present disclosure.

Using the desk operating threshold the mobile computing device interoperates with the server computer to determine 735 whether the number of desks in active status is equal to or otherwise at the threshold. For instance, in some examples, the mobile computing device requests that the server computer provide the maximum number of desks allowed to move at one time and the number of desks currently flagged as running within a group via the power management service and determines whether or not to adjust the desks. One example of an embodiment that executes according to this configuration is described further below with reference to FIG. 12. In other embodiments, the mobile computing device requests that the server computer determine whether the threshold has been reached and then provides instructions for operating the desk based on the server computer's response. In this one example, the power management engine of the server computer executes instructions and/or commands (e.g., the power management service 375 as previously described herein) to query or otherwise verify the status of each desk within group from the desk information stored in the desk database. Desks not currently operating (i.e., adjusting its height) are identified in the database with an inactive status. Desks currently operating, on the other hand, are identified with a status of active. The server computer utilizes both, the threshold and desk database, to determine whether the request to change status of the desk can be granted. If the threshold is reached, then the server computer responds back to the application to record 740 the desk in inactive status. In response, the application does not operate the desk. The application, in some embodiments, is configured to provide a notification, as shown in FIG. 9, to the user explaining why the desk can be operated at this time. Furthermore, the power management application may also temporarily lock the user interface of the application 750. As illustrated in FIG. 8, the user-interface includes a locked icon that indicates that the desk cannot be adjusted at this time. When locked, the operational control features (e.g., up and down control buttons and pre-set menu) of the power management application do not respond to inputs performed thereon. Thus, further requests for a change in status cannot be sent to the server computer at this time. This is noteworthy, because server computer can respond to several desks efficiently and quickly without repeated requests from the same desk. The computer server can, therefore, actively manage the entire group of desks to coordinate the operation of each desk. As can be seen in FIG. 10, the control buttons (up and down) and pre-set position menu are grayed out or otherwise shaded to indicate to a user that these functions are not available. In some examples, the entire user-interface is unavailable. In yet some examples, portions of the user-interface are accessible to the user, for example, some or all of the icons within the navigation toolbar.

With the user-interface of the application temporarily locked, the user awaits 760 a period of time before adjusting the desk. Generally speaking, the time period in which the user-interface is locked provides a sufficient amount of time to allow one or more active desks to perform their adjustments. The amount of time in which a user waits can vary depending on many factors, such as the number of desks in the group, the threshold limit, and the number of desks seeking active status. For instance, if the group of desks includes two desks, then the time in which the user-interface could be relatively short (e.g., 12 seconds or less). On the other hand, the time to temporarily lock the user interface may be longer (e.g., one minute or several minutes) for a group that includes many desks (e.g., 25 desks). Similarly, higher thresholds can allow for shorter delays caused by the temporarily locked user-interface because more desks are able to operate at one time.

Once the server computer has authorized the power management application on the mobile computing device, the user is free to adjust 770 the desk to the appropriate height using the control buttons (e.g., up and down buttons) or selecting the user-programmable pre-set heights, as previously described herein. In some examples, the power management application on the mobile computing device authorizes movement of the desk. In particular, the mobile computing device transmits control signals to the desks via the desk control interface 490. In other examples, the mobile computing device transmits information to the server computer to generates and transmit desk control signals to the desk via the desk control interface 380 of the server computer. No matter the source of the control signals, once the signals are received and processed by the remote-control interface 545 the desk is adjusted via the desk control system 540. The desk, however, is adjustable for a limited period time before the desk reverts to inactive status. Limiting the time each desk is in active status ensures that other desks have an opportunity to make adjustments. In general, the time in which each desk is in active status should be sufficient to allow the user to make at least one adjustment to the height of the desk. In this one example, the desk can remain in active status for a period of time of 30 secs. In other instances, the time in which the desk is in active status can be 20 secs, 45 secs, 50, secs, or one minute. In some examples, the desk can remain in active status, until the desk has remained stationary for a period of time (15 secs). This may be preferable in some instances, in which the user is making adjustments using the up and down control buttons and the desired height of the desk is not known to the user (e.g., first time using the desk). In other examples, the accomplishment of pre-programmed adjustment can trigger the desk to switch from active to inactive. In such instances, a desk can be in active status for a time 12 secs or less. In some other examples, the time in which a desk is active may include time to complete at least one pre-programmed height adjustment and further include additional time (e.g., 15 or 20 secs) fine tune the desk height.

Methodology for Device Pairing

Figure 11:
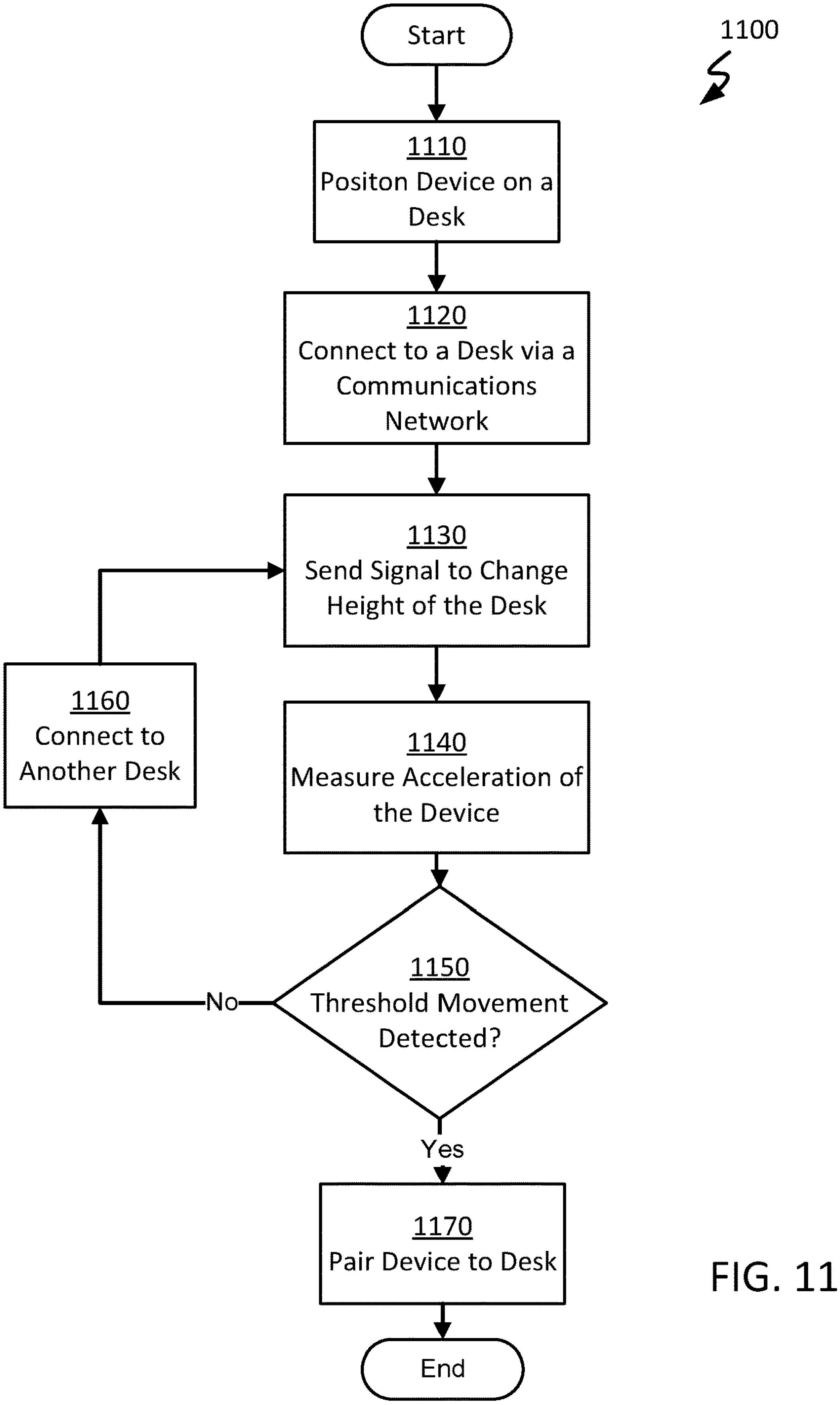
FIG. 11 is a flowchart illustrating an example method of pairing a mobile computing device to a power-adjustable desk, in accordance with an embodiment of the present disclosure.

FIG. 11 is a flowchart illustrating an example method 1100 of pairing a mobile computing device to an adjustable desk, in accordance with an embodiment of the present disclosure. The method 1100 includes positioning 1110 the mobile computing device on the desk. Generally speaking, the user may place or otherwise position the mobile computing device on any portion of the work surface of the desk, such that the device accelerates as the work surface moves. In some examples, the device is placed directly on the work surface, such that the device and the work surface are in direct contact with each other. In some other examples, the device is placed on work surface by not in contact with the surface (e.g., the device is placed on a book or notepad positioned on the work surface).

With the phone positioned on the desk, the method 1100 further includes connecting 1120 the mobile computing device to a desk via a communications network. As previously described herein, the desk can include a network interface(s) to establish a network connection with the power management application on the mobile computing device. In this one example, each desk within the system is connected to one mobile computing device at one time. The mobile computing device establishes a connection with nearest available desk (i.e., a desk not connected with a mobile computing device) within the area. This can be done, for instance, using the pairing engine of the device, as previously described herein. In some examples, the application determines the relative signal strength of the networks associated with the available desks. The application may be configured to select the network with the greatest signal as the network to establish a connection therewith. In most cases, the desk on which the mobile computing device is placed or otherwise adjacent to is likely to have the strongest network signal.

Using the communications network, the method 1100 further includes sending 1130 a signal to the desk to change a height of the desk. In this one example, desk receives instructions from the device using the network interface(s). The interface transmits the instructions to the processor, which in turn sends one or more signals to the desk control system to execute a change in height of the desk (e.g., a small adjustment in height, ¼", 5⁄16" or ½"). As the height of the desk is adjusted, the mobile computing device measures 1140 the acceleration of the device using one or more accelerometers disposed therein. Since the mobile computing device is positioned on the work surface of the desk, a change in height of the desk causes the device to experience a change in acceleration (e.g., from resting to 1 in/sec$^2$). If the mobile computing device does not detect 1150 a change in acceleration, then the device is communicating with a different desk, and not the desk on which the device is currently positioned on. In such instances, the mobile computing device disconnects from the network of the current desk and selects another nearby desk to establish another network connection 1160 with a different desk. The mobile computing device repeats steps 1130 and 1140 until a change in movement (e.g., acceleration) is detected. A change in movement of the mobile computing device confirms that the device is connected to the desk on which it is placed. The mobile computing device is next paired 1170 with the desk to communicatively couple or otherwise link the device to the desk so that the application can control or otherwise operate the desk within the system.

Another Example Methodology for a Power Management Application

Figures 12, 12A:
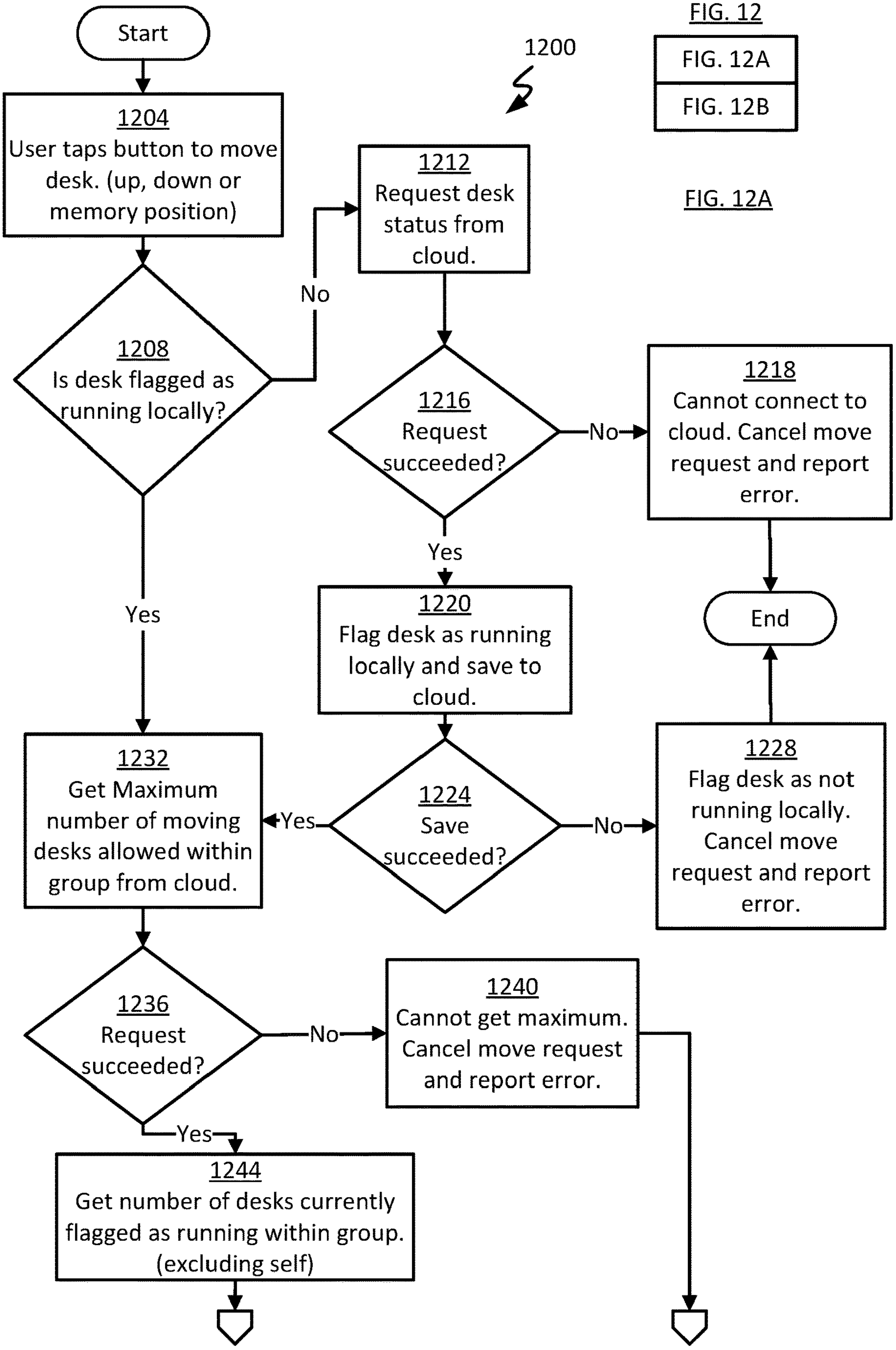
FIGS. 12A and 12B, which are collectively referred to as FIG. 12, are a flowchart illustrating an example method of operating a plurality of power adjustable desks using a power management application, in accordance with another embodiment of the present disclosure.
Figures 12, 12B:
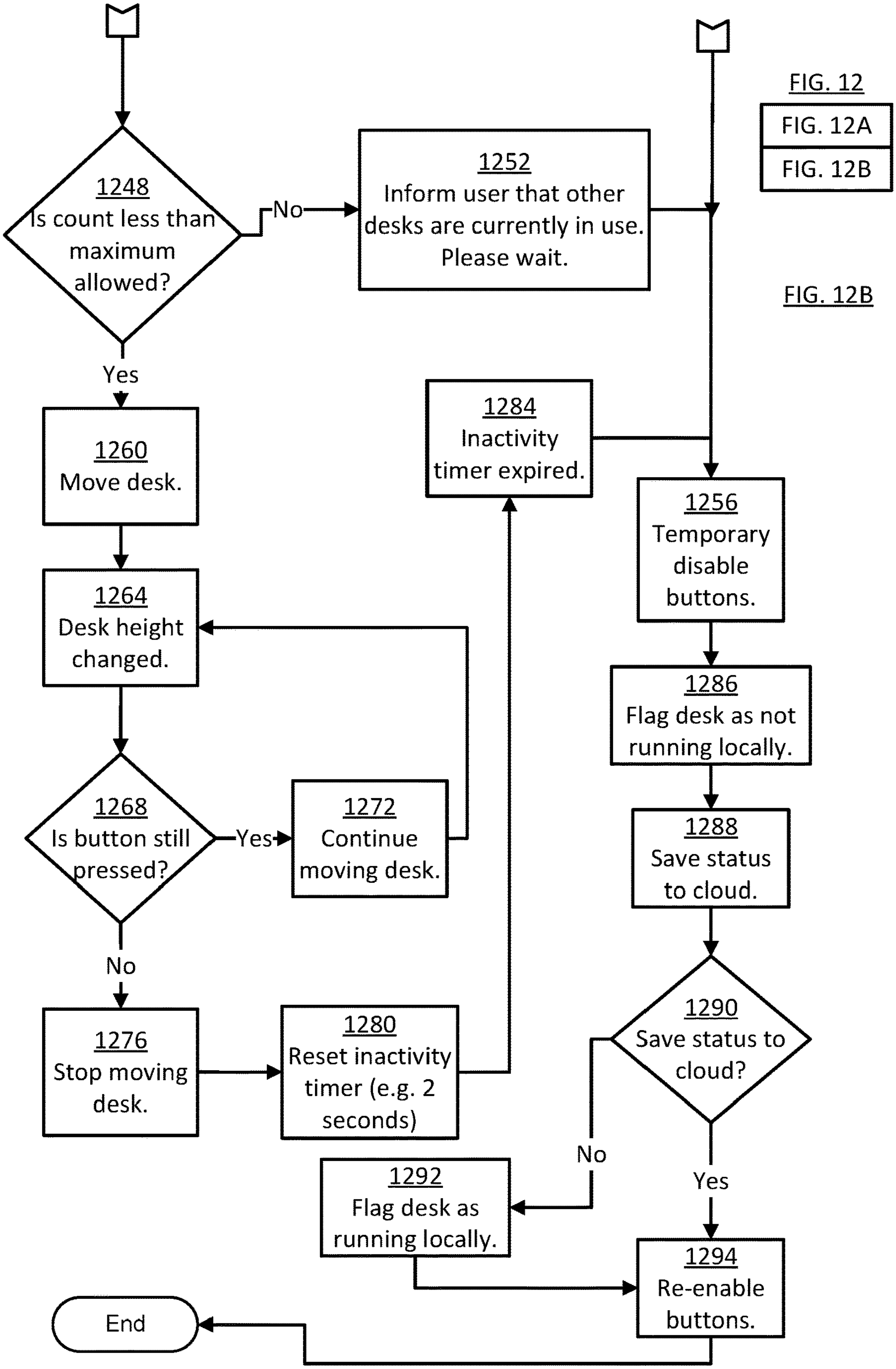

FIG. 12 is a flowchart illustrating an example method of operating a plurality of adjustable desks using a power management application, in accordance with another embodiment of the present disclosure. The method 1200 includes a user tapping 1204 a button of the user-interface of the mobile computing device to generate a move request to adjust the desk (e.g., up, down or to a memory position). In response to receiving the user input, the mobile computing device (e.g., the desk control interface) verifies 1208 the status of the desk (e.g., is the desk in active or inactive status or otherwise flagged as running locally). The mobile computing device can verify desk status using information stored on the device or otherwise received from the desk or server computer. If the desk is not verified to be currently operating, the mobile computing device can request 1212 to change desk status (e.g., from inactive to active status or from not running to running status) from the server computer via the network. The mobile computing device is further configured to determine 1216 whether the request was request was successfully received or not by the server computer (e.g., the power management service). In some examples, the mobile computing device can receive a notification from the server computer via the network indicating that the request was successfully received. If the request 1212 is not successful (e.g., mobile computing device cannot connect to the cloud to transmit the request to the server computer), then the mobile computing device can cancel 1218 the move request and report a system error to the user, for example by displaying an error message on the user interface. In response to a successful request 1212, the desk is identified 1220 with a status of active or running locally. The status can be saved or otherwise stored by server computing (e.g., using the desk database) and/or on the mobile computing device (e.g., using the desk settings database). The mobile computing device is further configured to determine 1224 whether the change in status has been saved by the server computer. For example, in some applications, the mobile computing device receives a notification from the server computer (e.g., from the power management service) that indicates that the status change is saved. If the new status of the desk cannot be saved, then the server computer, in some examples, identifies 1228 the desk as inactive status or otherwise not running locally. In addition, the mobile computing device can cancel the move request 1212. In some, examples, the mobile computing device can generate an error message that is displayed on the user interface.

When the status of the desk is verified 1208 as active (or running locally) or has been saved 1220 as active status, the mobile computing device (e.g., the desk control interface) can retrieve or otherwise request 1232 the maximum number of moving desks allowed within a group of desks (e.g., the desk operating threshold) from the server computer via the network. In this one example the mobile computing device is configured to determine 1236 whether the request for the number of allowable moving desks was received. If the request is unsuccessful then the mobile computing device cancels 1240 the move request and reports a system error to the user. Furthermore, the mobile computing device may temporarily disable 1256 buttons of the user interface, as will be described in further detail below. On the other hand, if the request 1232 is determined 1236 to be successful then the mobile computing device retrieves 1244 the number of desks that are currently in active status or otherwise running locally within the group of desks from the server computer (e.g., from the power management service and/or desk database). The number of desks in active status, in some examples, excludes the desk associated with the mobile computing device. In response to receiving 1244 the number of active desks, the mobile computing device determines 1248 whether that number is less than a maximum number of desks (e.g., the desk operating threshold). In some examples, the mobile computing device may use processes or logic functions to compare the number of active desks to the desk operating threshold. If the number of desks currently operating is above the maximum number, then the mobile computing device notifies 1252 the user, for example via a dialogue or pop-up message, that are desks are currently in use or otherwise operating. The mobile computing device, in some examples may configured to temporarily disable 1256 buttons of the user interface, as will be described in further detail below. On the other hand, if the number of desks in active status is less than the desk operating threshold, the mobile computing device can generate and transmit instructions and/or commands to move 1260 the desk. The desk can be moved in accordance with the move request 1105 provided by the user (e.g., the user input may select a pre-programmed desk adjustment).

In response to transmitting instructions to operate the desk, the mobile computing device receives 1264 information (or an indication signal) from the desk that it has moved. Once the desk has moved, the mobile computing device (e.g., the desk control interface) determines 1268 whether or not the user is providing a user input (e.g., continues to press the button) on the user interface of the device. Using one or more sensors operatively coupled to the display of the device, the mobile computing device can sense or otherwise detect a user input. If the mobile computing device determines 1268 that the user is providing an input (e.g., still pressing the button) then the device is configured to transmit additional instructions to further move 1272 the desk. The mobile computing device is configured to repeat steps 1264 and 1268, as previously described above. On the other hand, when the mobile computing device determines 1268 that the user is no longer providing an input (e.g., button no longer being pressed), then the device is configured to stop 1276 transmitting instructions to move the desk. Once the desk has stopped moving, the mobile computing device is configured to reset 1280 an inactivity timer. The inactivity timer counts time for a pre-determined period (e.g., 30 secs or 1 min), in which the no desk adjustments are performed (e.g., the time after the user completes the desk adjustment). Once the inactivity timer expires 1284 or otherwise times out, the timer, in some examples, generates a signal to temporarily disable 1256 some (or all) of the buttons of the user interface (or the entire interface itself). With the interface disabled or otherwise locked the mobile computing device can identify 1286 to the server computer (e.g., the power management service) that the desk associated with it is in inactive status (or otherwise no longer running locally). In response, the server computer saves 1288 the status of the desk, for example within the desk database. The mobile computer device is further configured to determine 1290 whether the change in desk status was saved. In some examples, the mobile computing device may receive a notification from the server computer (e.g., from the power management service) that the server has updated the status of the desk associated with the device. If for some reason the server computer is unable to save 1288 the desk status, then the mobile computer will continue to identify 1292 the desk associated with it as in active status (or locally running), and re-enables buttons of the user interface. On the other hand, if the mobile computing device determines 1290 that the change in status was saved, the device is configured to re-enable 1294 or unlock the user interface so that a user can make the subsequent desk adjustment using the application.

Furthermore, note that it is appreciated that the above method can be executed by one or more components of the mobile computing device (e.g., the desk control interface, network interface(s), etc.) individually or together in combination. It is also appreciated that various steps of the above method can be accomplished by components of other systems devices (server or desks). In some examples, the components executing the method (as described above) can be in a single device (e.g., one of the mobile computing device, the server or the desk). It is further understood and appreciated; that the components can also be located on multiple different devices (e.g., any combination of the mobile computing device, the desk, and the server) to collectively perform the described method.

Further Considerations

Numerous other power-adjustable furniture management system and application configurations will be apparent in light of the present disclosure. For example, in some examples, both the mobile computing devices and desks are communicatively coupled to the server computer via network. Thus, some of the computing tasks (e.g., generating and transmitting operating instructions to desks 110A-D) performed by the devices are now re-allocated to the server computer. The re-allocation of system tasks allows the power management application to utilize less mobile computing device resources (e.g., electrical power, processing power, and memory), which can be limited on such devices. In some examples, the server receives and verifies desk status change requests from the devices and is further configured to generate and transmit instructions to the desks in a similar fashion as previously described herein in relation to devices. The mobile computing devices and desks, in some examples, can still be connected via a local network to exchange information. In other examples, information is exchange between the mobile computing devices and desks via the server computer over the network. In such examples, there is no local network between the devices and desks. Numerous other power-adjustable furniture management system and application configurations will be apparent in light of the present disclosure.

In some examples, the power management application is locked when the network connection between the mobile computing device and network is unavailable. For instances, situations may occur when the network may be unavailable, but the local network is available. In such situations, the mobile computing device can still exchange information with the desk via the local network. Thus, there is a potential that the power management application could transmit operating instructions to the desk without first receiving authorization from the server computer via the network. This could possibly lead to multiple desks operating at once and electrically overloading the system. To prevent such an occurrence, the power management application automatically locks itself in response the mobile computing device not being connected to the network. Locking the application prevents a user from operating the desk without first receiving authorization from the server computer.

In another example application, the system is configured so that the power management application uses less processing resources and power of the mobile computing device to improve device performance. In one example, the desks may be connected directly to the server via a network. In some such applications, the user may interact or otherwise operate the desks using a switch disposed thereon rather than a graphical-user interface (GUI) of the mobile computing devices. Thus, a fewer number of functions are performed by the mobile computing device, and reducing processing resources and power of the device used by the power management application. In addition, in some examples, the GUI displayed on the mobile computing device can include fewer features because the desks are performing some of the power management application functions. Less sophisticated or complex GUIs allow the power management application to utilize fewer computing resources and thereby improve the operating efficiency of the mobile computing device. In yet some examples, the mobile computing devices may not include a GUI, which can further reduce power consumption and improve efficiency of the power management application on the device.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

The invention claimed is:

1. A power-adjustable furniture control system comprising:

a mobile computing device comprising
 a memory;
 a user interface;
 at least one network interface; and
 at least one processor coupled to the memory, the user interface, and the at least one network interface, and configured to
  receive, via the user interface, input requesting an adjustment of a piece of power-adjustable furniture;
  transmit, to a server via the at least one network interface, a request to change a status associated with the piece of power-adjustable furniture to active;
  receive, from the server via the at least one network interface, a notification indicating whether the server changed the status to active;
  determine whether the notification indicates the server changed the status to active; and
  transmit, to the piece of power-adjustable furniture via the at least one network interface, an instruction to perform the adjustment where the notification indicates the server changed the status to active.

2. The power-adjustable furniture control system of claim 1, wherein the at least one processor is further configured to display, via the user interface, a message indicating the piece of power-adjustable furniture cannot be adjusted where the notification indicates the server did not change the status to active.

3. The power-adjustable furniture control system of claim 2, further comprising the server, wherein the server comprises:

a server memory storing group data comprising
 first data identifying a plurality of pieces of power-adjustable furniture coupled to a power distribution system, the plurality of pieces comprising the piece of power-adjustable furniture;
 second data specifying a maximum number of the plurality of pieces of power-adjustable furniture to which the power distribution system is designed to supply concurrently power for adjustment; and
 third data specifying a total number of the plurality of pieces of power-adjustable furniture associated with a status of active.

4. The power-adjustable furniture control system of claim 3, wherein the at least one processor is further configured to:

transmit, to the server via the at least one network interface, a request to specify the maximum number;
receive, from the server via the at least one network interface, a response specifying the maximum number;
transmit, to the server via the at least one network interface, a request to specify the total number;
receive, from the server via the at least one network interface, a response specifying the total number;
compare the maximum number to the total number to determine whether the total number is less than the maximum number; and
transmit, to the piece of power-adjustable furniture via the at least one network interface, the instruction to perform the adjustment where the notification indicates the server changed the status to active and the total number is less than the maximum number.

5. The power-adjustable furniture control system of claim 4, wherein the at least one processor is further to display, via the user interface, the message indicating the piece of power-adjustable furniture cannot be adjusted where either the notification indicates the server did not change the status to active or the total number is not less than the maximum number.

6. The power-adjustable furniture control system of claim 3, wherein the server further comprises one or more processors coupled to one or more network interfaces and the one or more processors are configured to:

receive, from the mobile computing device via the one or more network interfaces, the request to change the status;

compare the maximum number to the total number to determine whether the total number is less than the maximum number;

change the status to active where the total number is less than the maximum number; and transmit, to the mobile computing device via the one or more network interfaces, a notification indicating that the server changed the status to active.

7. The power-adjustable furniture control system of claim 6, wherein the one or more processors are further configured to:

maintain the status as inactive where the total number is less than the maximum number; and transmit, to the mobile computing device via the one or more network interfaces, a notification indicating that the server did not change the status to active.

8. The power-adjustable furniture control system of claim 1, wherein the mobile computing device is one or more of a smart phone and a tablet, and the piece of power-adjustable furniture is a power-adjustable desk.

9. The power-adjustable furniture control system of claim 1, wherein the at least one network interface comprises a first network interface configured to communicate with the piece of power-adjustable furniture and a second network interface configured to communicate with the server.

10. The power-adjustable furniture control system of claim 9, wherein the mobile computing device comprises an accelerometer and the at least one processor is further configured to pair the mobile computing device with the piece of power-adjustable furniture at least in part by:

transmitting, to the piece of power-adjustable furniture via the first network interface, an instruction to execute a movement that is detectable by the accelerometer; and identifying, via the accelerometer, the movement.

11. A method for controlling a piece of power-adjustable furniture using a mobile computing device, the method comprising:

receiving, via a user interface of the mobile computing device, input requesting an adjustment of the piece of power-adjustable furniture;

transmitting, to a server via at least one network interface of the mobile computing device, a request to change a status associated with the piece of power-adjustable furniture to active;

receiving, from the server via the at least one network interface, a notification indicating whether the server changed the status to active;

determining whether the notification indicates the server changed the status to active;

transmitting, to the piece of power-adjustable furniture via the at least one network interface, an instruction to perform the adjustment where the notification indicates the server changed the status to active; and displaying, via the user interface, a message indicating the piece of power-adjustable furniture cannot be adjusted where the notification indicates the server did not change the status to active.

12. The method of claim 11, further comprising:

transmitting, to the server via the at least one network interface, a request to specify a maximum number of pieces of power-adjustable furniture that a power distribution system coupled to the piece of power-adjustable furniture is designed to supply concurrently power for adjustment;

receiving, from the server via the at least one network interface, a response specifying the maximum number;

transmitting, to the server via the at least one network interface, a request to specify a total number of pieces of power-adjustable furniture coupled to the power distribution system that are associated with a status of active;

receiving, from the server via the at least one network interface, a response specifying the total number;

comparing the maximum number to the total number to determine whether the total number is less than the maximum number;

transmitting, to the piece of power-adjustable furniture via the at least one network interface, the instruction to perform the adjustment where the notification indicates the server changed the status to active and the total number is less than the maximum number; and displaying, via the user interface, the message indicating the piece of power-adjustable furniture cannot be adjusted where either the notification indicates the server did not change the status to active or the total number is not less than the maximum number.

13. The method of claim 12, further comprising:

receiving, from the mobile computing device via one or more network interfaces of the server, the request to change the status;

comparing the maximum number to the total number to determine whether the total number is less than the maximum number;

changing the status to active where the total number is less than the maximum number; and transmitting, to the mobile computing device via the one or more network interfaces, a notification indicating that the server changed the status to active.

14. The method of claim 12, further comprising:

maintaining the status as inactive where the total number is less than the maximum number; and transmitting, to the mobile computing device via the one or more network interfaces, a notification indicating that the server did not change the status to active.

15. The method of claim 11, wherein receiving the input comprising receiving the input via either a smart phone or a tablet and transmitting the instruction comprising transmitting an instruction to a power-adjustable desk.

16. The method of claim 11, further comprising pairing the mobile computing device with the piece of power-adjustable furniture at least in part by:

transmitting, to the piece of power-adjustable furniture via the at least one network interface, an instruction to execute a movement; and identifying, via an accelerometer of the mobile computing device, the movement.

17. A non-transitory computer-readable medium storing sequences of computer executable instructions for controlling a piece of power-adjustable furniture, the sequences of computer executable instructions comprising instructions to:

receive, via a user interface, input requesting an adjustment of the piece of power-adjustable furniture;

transmit, to a server via at least one network interface, a request to change a status associated with the piece of power-adjustable furniture to active;

receive, from the server via the at least one network interface, a notification indicating whether the server changed the status to active;

determine whether the notification indicates the server changed the status to active;

transmit, to the piece of power-adjustable furniture via the at least one network interface, an instruction to perform the adjustment where the notification indicates the server changed the status to active; and display, via the user interface, a message indicating the piece of power-adjustable furniture cannot be adjusted where the notification indicates the server did not change the status to active.

18. The computer-readable medium of claim 17, wherein the sequences of computer executable instructions further comprise instructions to:

transmit, to the server via the at least one network interface, a request to specify a maximum number of pieces of power-adjustable furniture that a power distribution system coupled to the piece of power-adjustable furniture is designed to supply concurrently power for adjustment;

receive, from the server via the at least one network interface, a response specifying the maximum number;

transmit, to the server via the at least one network interface, a request to specify a total number of pieces of power-adjustable furniture coupled to the power distribution system that are associated with a status of active;

receive, from the server via the at least one network interface, a response specifying the total number;

compare the maximum number to the total number to determine whether the total number is less than the maximum number;

transmit, to the piece of power-adjustable furniture via the at least one network interface, an instruction to perform the adjustment where the notification indicates the server changed the status to active and the total number is less than the maximum number; and display, via the user interface, a message indicating the piece of power-adjustable furniture cannot be adjusted where either the notification indicates the server did not change the status to active or the total number is not less than the maximum number.

19. The computer-readable medium of claim 18, wherein the sequences of computer executable instructions are executable by either a processor within a desktop computer or a processor within the piece of power-adjustable furniture.

20. The computer-readable medium of claim 19, wherein the piece of power-adjustable furniture is a power-adjustable desk.

* * * * *